(12) United States Patent
Fujishiro

(10) Patent No.: US 10,973,080 B2
(45) Date of Patent: Apr. 6, 2021

(54) RADIO TERMINAL, PROCESSOR, AND BASE STATION

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 26 days.

(21) Appl. No.: 16/577,990

(22) Filed: Sep. 20, 2019

(65) Prior Publication Data

US 2020/0015315 A1     Jan. 9, 2020

Related U.S. Application Data

(63) Continuation of application No. PCT/JP2018/011487, filed on Mar. 22, 2018.

(30) Foreign Application Priority Data

Mar. 24, 2017     (JP) .............................. JP2017-059030

(51) Int. Cl.
  *H04W 72/04* (2009.01)
  *H04W 76/36* (2018.01)
  (Continued)

(52) U.S. Cl.
  CPC ........... *H04W 76/36* (2018.02); *H04W 24/08* (2013.01); *H04W 72/0446* (2013.01); *H04W 72/0453* (2013.01); *H04W 76/11* (2018.02)

(58) Field of Classification Search
  CPC ..... H04W 76/36; H04W 76/11; H04W 24/08; H04W 72/0446; H04W 72/0453; H04W 76/30
  See application file for complete search history.

(56) References Cited

U.S. PATENT DOCUMENTS

2012/0044812 A1*  2/2012  Hiddink ............ H04W 36/0077
                                                        370/241
2014/0112289 A1*  4/2014  Kim ..................... H04L 5/0078
                                                        370/329
(Continued)

FOREIGN PATENT DOCUMENTS

WO   WO-2016091285 A1 *  6/2016  .......... H04W 74/004
WO       2016/185923 A1    11/2016

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); 3GPP TS 36.300 V14.1.0; Dec. 2016; pp. 1-317; Release 14; 3GPP Organizational Partners.

*Primary Examiner* — Joseph E Dean, Jr.
(74) *Attorney, Agent, or Firm* — Studebaker & Brackett PC

(57)     ABSTRACT

A communication method according to one embodiment comprises starting, by a first radio communication apparatus, transmission using a plurality of time and frequency resources which is allocated in order to transmit data to a second radio communication apparatus and is arranged in a time direction. The second radio communication apparatus starts monitoring in the plurality of time and frequency resources in order to receive the data from the first radio communication apparatus. The first radio communication apparatus transmits last data and last identification information indicating transmission of the last data to the second radio communication apparatus, at transmitting the last data to be transmitted to the second radio communication apparatus.

4 Claims, 15 Drawing Sheets

(51) Int. Cl.
*H04W 76/11* (2018.01)
*H04W 24/08* (2009.01)

(56) References Cited

U.S. PATENT DOCUMENTS

2016/0366594 A1* 12/2016 Chang .................. H04L 5/0048
2018/0070367 A1   3/2018 Fujishiro et al.

* cited by examiner

RADIO TERMINAL, PROCESSOR, AND BASE STATION

RELATED APPLICATIONS

The present application is a continuation based on PCT Application No. PCT/JP2018/011487, filed on Mar. 22, 2018, which claims the benefit of Japanese Patent Application No. 2017-059030 (filed on Mar. 24, 2017). The content of which is incorporated by reference herein in their entirety.

TECHNICAL FIELD

The present disclosure relates to a radio terminal, a processor, and a base station.

BACKGROUND ART

Dynamic scheduling is performed in a specification developed by the 3rd Generation Partnership Project (3GPP) which is a standardization project of a mobile communication system. A radio terminal receives user data from Evolved Universal Terrestrial Radio Access Network (E-UTRAN) or transmits the user data to the E-UTRAN based on scheduling information indicating radio resources allocated from the E-UTRAN.

The E-UTRAN can perform semi-persistent scheduling (SPS) other than the dynamic scheduling. The radio terminal can receive the user data from the E-UTRAN or can transmit the user data to the E-UTRAN by using a plurality of time and frequency resources which is allocated through the SPS and is arranged in a time direction even though the scheduling information is received every time.

SUMMARY

A communication method according to one embodiment comprises starting, by a first radio communication apparatus, transmission using a plurality of time and frequency resources which is allocated in order to transmit data to a second radio communication apparatus and is arranged in a time direction. The second radio communication apparatus starts monitoring in the plurality of time and frequency resources in order to receive the data from the first radio communication apparatus. The first radio communication apparatus transmits last data and last identification information indicating transmission of the last data to the second radio communication apparatus, at transmitting the last data to be transmitted to the second radio communication apparatus.

A processor according to one embodiment is a processor for controlling a first radio communication apparatus. The processor is configured to perform a process of starting transmission using a plurality of time and frequency resources which is allocated in order to transmit data to a second radio communication apparatus and is arranged in a time direction, and a process of transmitting last data and last identification information indicating transmission of the last data to the second radio communication apparatus at transmitting the last data to be transmitted to the second radio communication apparatus.

A communication method according to one embodiment comprises transmitting, by a radio terminal, uplink information at least one time to a network apparatus at a predetermined cycle. The network apparatus retains downlink information until the uplink information is received when the downlink information to be transmitted to the radio terminal is generated. The network apparatus starts transmission of the downlink information in response to reception of the uplink information. The radio terminal starts monitoring of the downlink information in response to transmission of the uplink information.

A processor according to one embodiment is a processor for controlling a radio terminal. The processor is configured to perform a process of transmitting uplink information at least one time to a network apparatus at a predetermined cycle, and a process of starting, in response to transmission of uplink information, monitoring of downlink information from the network apparatus retaining the downlink information until the uplink information is received when the downlink information to be transmitted to the radio terminal is generated.

A processor according to one embodiment is a processor for controlling a network apparatus. The processor is configured to perform a process of retaining downlink information until uplink information is received when the downlink information to be transmitted to a radio terminal which transmits the uplink information at least one time to the network apparatus at a predetermined cycle is generated, and a process of starting, by the network apparatus, transmission of the downlink information in response to reception of the uplink information.

DESCRIPTION OF EMBODIMENTS

[Outline of Embodiment]

Figure 1:
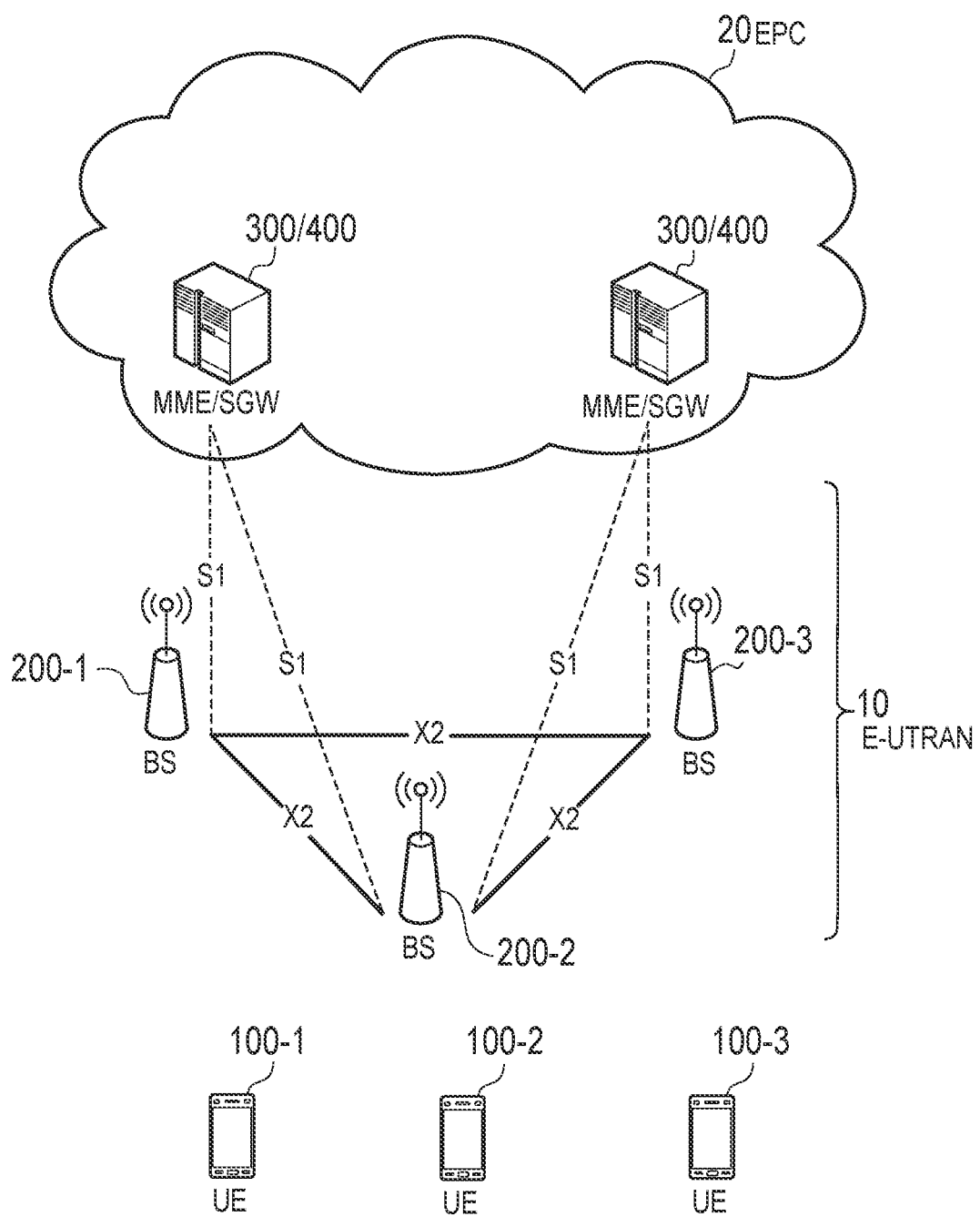
FIG. 1 is a diagram illustrating a configuration of a mobile communication system.

In a communication method according to an embodiment, a first radio communication apparatus starts transmission using a plurality of time and frequency resources which is allocated in order to transmit data to a second radio communication apparatus and is arranged in a time direction. The second radio communication apparatus starts monitoring in the plurality of time and frequency resources in order to receive the data from the first radio communication apparatus. The first radio communication apparatus transmits the last data and last identification information indicating transmission of the last data to the second radio communication apparatus at the time of transmitting the last data to be transmitted to the second radio communication apparatus.

The second radio communication apparatus may terminate the monitoring in response to reception of the last identification information.

The second radio communication apparatus may perform processing for releasing the plurality of time and frequency resources in response to reception of the last identification information.

The first radio communication apparatus may perform processing for releasing the plurality of time and frequency resources in response to transmission of the last identification information.

The first radio communication apparatus may predict that new data to be transmitted to the second radio communication apparatus is not to be generated during a predetermined period after the last data is transmitted. The first radio communication apparatus may transmit the last identification information to the second radio communication apparatus in response to the prediction.

A processor according to an embodiment is a processor for controlling a radio communication apparatus (first radio communication apparatus). The processor performs a process of starting transmission using a plurality of time and frequency resources which is allocated in order to transmit data to a second radio communication apparatus and is arranged in a time direction, and a process of transmitting the last data and last identification information indicating transmission of the last data to the second radio communication apparatus at the time of transmitting the last data to be transmitted to the second radio communication apparatus.

In a communication method according to an embodiment, a radio terminal transmits uplink information to a network apparatus at a predetermined cycle at least one time. The network apparatus retains downlink information until the uplink information is received when the downlink information to be transmitted to the radio terminal is generated. The network apparatus starts transmission of the downlink information in response to reception of the uplink information. The radio terminal starts monitoring of the downlink information in response to transmission of the uplink information.

The radio terminal may notify the network apparatus of information indicating the predetermined cycle.

The radio terminal may terminate the monitoring of the downlink information in response to completion of reception of all the downlink information retained by the network apparatus.

The radio terminal may terminate the monitoring of the downlink information in response to a predetermined period having elapsed after the monitoring is started.

The network apparatus may notify the radio terminal of information indicating an upper limit of the predetermined cycle.

The network apparatus may start a procedure for releasing information on the radio terminal when next uplink information is not received from the radio terminal even though a period based on the predetermined cycle has elapsed after the uplink information is received.

A processor according to an embodiment is a processor for controlling a radio terminal. The processor performs a process of transmitting uplink information to a network apparatus at a predetermined cycle at least one time, and a process of starting, in response to transmission of uplink information, monitoring of downlink information from the network apparatus configured to retain the downlink information until the uplink information is received when the downlink information to be transmitted to the radio terminal is generated.

A processor according to an embodiment is a processor for controlling a network apparatus. The processor performs a process of retaining downlink information until uplink information is received when the downlink information to be transmitted to a radio terminal configured to transmit the uplink information to the network apparatus at a predetermined cycle at least one time is generated, and a process of starting, by the network apparatus, transmission of the downlink information in response to reception of the uplink information.

(Mobile Communication System)

In the following, a description will be given of a mobile communication system. FIG. 1 is a diagram illustrating a configuration of the mobile communication system. A description will be given citing an LTE system as an example of the mobile communication system.

As illustrated in FIG. 1, the LTE system includes a user equipment (UE) 100, an evolved universal terrestrial radio access network (E-UTRAN) 10, and an evolved packet core (EPC) 20.

The UE 100 corresponds to a radio communication apparatus (a radio terminal). The UE 100 is a mobile communication apparatus. The UE 100 performs radio communication with a cell (a BS 200 described later). A configuration of the UE 100 will be described later.

The E-UTRAN 10 corresponds to a radio access network. The E-UTRAN 10 includes a base station (BS) 200. The BS 200 corresponds to a (radio) base station. For example, the BS 200 is an evolved Node-B (eNB) 200. For example, the BS 200 may be a next Generation Node-B (gNB). The BS 200 may be a node which is capable of performing radio communication with the UE 100. Therefore, the BS 200 may be referred to as a radio communication device. Also, the BS 200 may be referred to as a network apparatus due to being included in the E-UTRAN 10. The BSs 200 may be interconnected via an X2 interface. A configuration of the BS 200 will be described later.

The BS 200 manages one or a plurality of cells. The BS 200 performs radio communication with the UE 100 which established connection with a cell that is managed by the BS 200. The BS 200 includes a radio resource management (RRM) function, a routing function for user data (hereinafter sometimes referred to as "data"), and a measurement control function for mobility control and scheduling, for example.

The "cell" is used as a term indicating a minimum unit of radio communication area. The "cell" may also be used as a term indicating a function of performing radio communication with the UE 100. The "cell" may be downlink resources. The "cell" may be a combination of the downlink resources and uplink resources. Linking between a carrier frequency of the downlink resources and a carrier frequency of the uplink resources may be included in system information transmitted on the downlink resources. The "cell" may be used as a term indicating a carrier and/or a frequency.

The EPC 20 corresponds to a core network. The EPC 20 may configure a network, together with the E-UTRAN 10. The EPC 20 includes a mobility management entity (MME) 300, and a serving gateway (SGW) 400.

For example, the MME 300 performs various types of mobility control on the UE 100. For example, the SGW 400 performs data transfer control. The MME 300 and the SGW 400 are connected to the BS 200 via an S1 interface.

Figure 2:
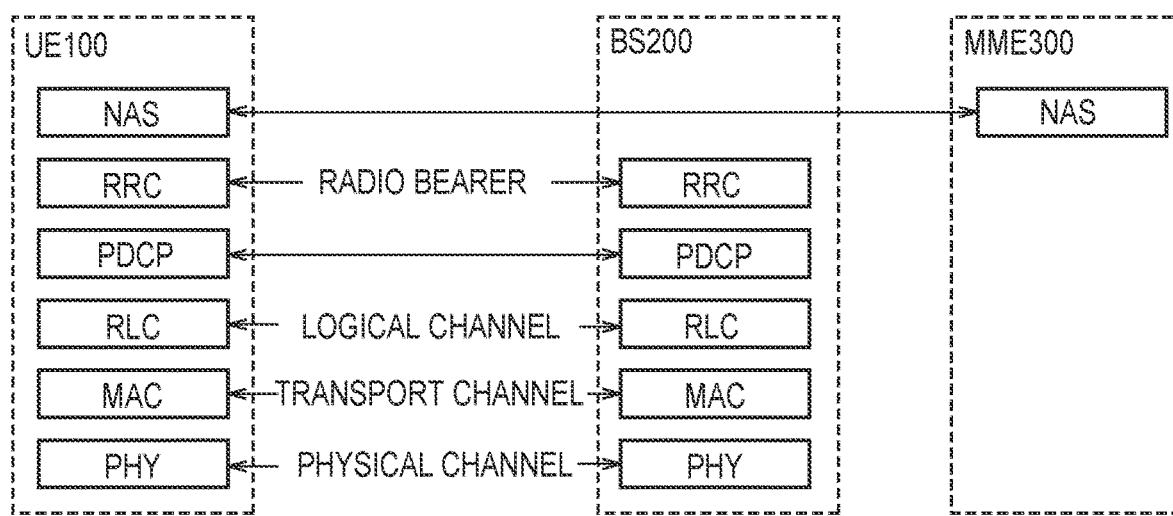
FIG. 2 is a protocol stack diagram of a radio interface.

FIG. 2 is a protocol stack diagram of a radio interface in the LTE system. As illustrated in FIG. 2, a radio interface protocol is classified into a first layer (layer 1) to a third layer (layer 3) of an OSI reference model. The first layer is a physical (PHY) layer. The second layer (layer 2) includes a medium access control (MAC) layer, a radio link control (RLC) layer, and a packet data convergence protocol (PRCP) layer. The third layer (layer 3) includes a radio resource control (RRC) layer.

The physical layer performs encoding and decoding, modulation and demodulation, antenna mapping and demapping, and resource mapping and demapping. Data and control signals are transmitted between the physical layer of the UE 100 and the physical layer of the BS 200 through a physical channel.

The MAC layer performs preferential control of data, a retransmission process by hybrid ARQ (HARQ), a random access procedure, and the like. Data and control signals are transmitted between the MAC layer of the UE 100 and the MAC layer of the BS 200 through a transport channel. The MAC layer of the BS 200 includes a scheduler (MAC scheduler). The scheduler determines a transport format (a transport block size, a modulation and coding scheme (MCS)) of an uplink and a downlink, and a resource block to be allocated to the UE 100.

The RLC layer transmits data to a receiving-side RLC layer by using functions of the MAC layer and the physical layer. Data and control signals are transmitted between the RLC layer of the UE 100 and the RLC layer of the BS 200 through a logical channel.

The PDCP layer performs header compression and decompression, and encryption (ciphering) and decryption (deciphering).

The RRC layer is defined only in a control plane where control signals are handled. Messages (RRC messages) for various settings are transmitted between the RRC layer of the UE 100 and the RRC layer of the BS 200. The RRC layer controls the logical channel, the transport channel, and the physical channel in response to establishment, re-establishment, and release of a radio bearer. In a case where there is an RRC connection between the RRC of the UE 100 and the RRC of the BS 200, the UE 100 is in an RRC connected state. In a case where there is no RRC connection between the RRC of the UE 100 and the RRC of the BS 200, the UE 100 is in an RRC idle state.

A non-access stratum (NAS) layer located above the RRC layer performs session management and mobility management, for example.

Figure 3:
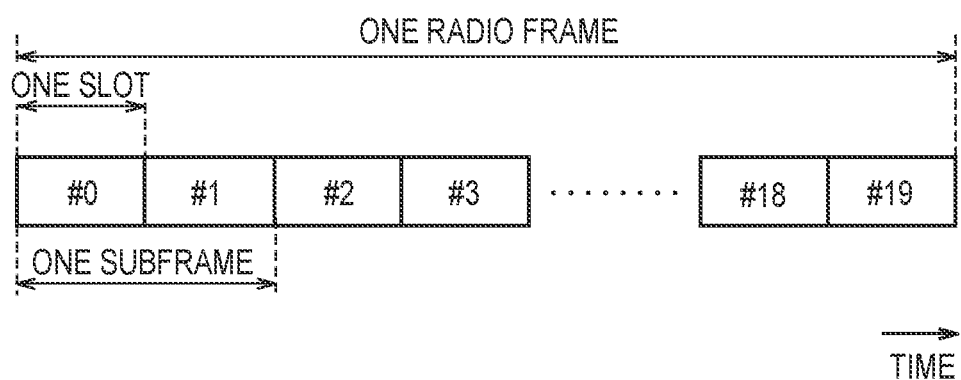
FIG. 3 is a configuration diagram of a radio frame used in an LTE system.

FIG. 3 is a configuration diagram of a radio frame used in an LTE system. In the LTE system, orthogonal frequency division multiple access (OFDMA) is applied in a downlink. Single carrier frequency division multiple access (SC-FDMA) is applied in an uplink.

As illustrated in FIG. 3, the radio frame includes ten subframes arranged in the time direction. Each subframe includes two slots arranged in the time direction. A length of each subframe is 1 ms. A length of each slot is 0.5 ms. Each subframe includes a plurality of resource blocks (RBs) in a frequency direction. Each subframe includes a plurality of symbols in the time direction. Each resource block includes a plurality of subcarriers in the frequency direction. Radio resources (time and frequency resources) are allocated to the UE 100 in which one resource element (RE) is constituted by one symbol and one subcarrier. In the frequency direction, the radio resource (frequency resource) is constituted by the resource blocks. In the time direction, the radio resource (time resource) is constituted by the subframes (or slots).

In the downlink, a period of several leading symbols of each subframe is an area capable of being used as a physical downlink control channel (PDCCH) for transmitting a downlink control signal. A remaining portion of each subframe is an area capable of being used as a physical downlink shared channel (PDSCH) for transmitting downlink data.

In the uplink, both end portions of each subframe in the frequency direction are areas capable of being used as physical uplink control channels (PUCCHs) for transmitting uplink control signals. A remaining portion of each subframe is an area capable of being used as a physical uplink shared channel (PUSCH) for transmitting uplink data.

(Radio Terminal)

Figure 4:
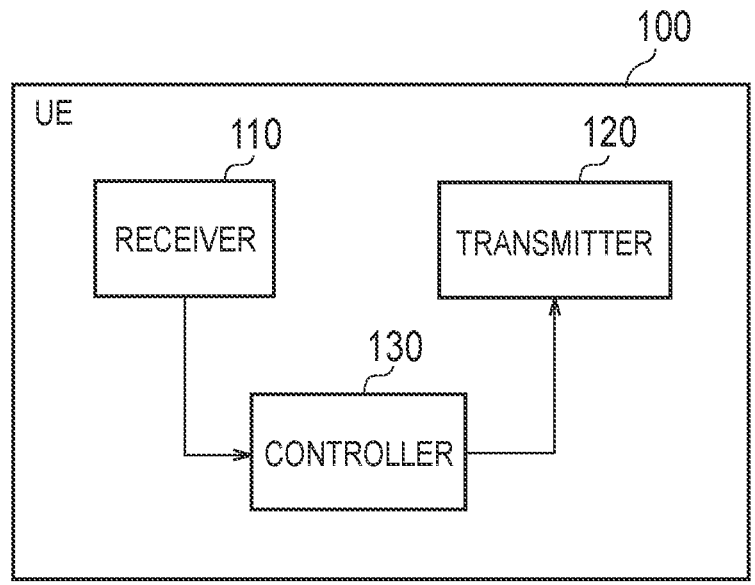
FIG. 4 is a block diagram of a UE 100.

A description will be given of the UE 100 (radio terminal) according to the embodiment. FIG. 4 is a block diagram of the UE 100. As illustrated in FIG. 4, the UE 100 includes a receiver 110, a transmitter 120, and a controller 130. The receiver 110 and the transmitter 120 may be an integrated transceiver.

The receiver 110 performs various types of reception under control of the controller 130. The receiver 110 includes an antenna. The receiver 110 converts a radio signal received by the antenna into a baseband signal (reception signal). The receiver 110 outputs the baseband signal to the controller 130.

The transmitter 120 performs various types of transmission under control of the controller 130. The transmitter 120 includes an antenna. The transmitter 120 converts the baseband signal (transmission signal) output by the controller 130 into a radio signal. The transmitter 130 transmits the radio signal from the antenna.

The controller 130 performs various types of control at the UE 100. The controller 130 includes a processor and a memory. The memory stores programs to be executed by the processor, and information to be used in processing by the processor. The processor includes a baseband processor and a central processing unit (CPU). For example, the baseband processor performs modulation/demodulation and coding/decoding of a baseband signal. The CPU performs various processes by executing the programs stored in the memory. The processor may include a codec for performing coding and decoding of audio/video signals. The processor executes various processes described later and various communication protocols described above.

The UE 100 may include a global navigation satellite system (GNSS) receiver. The GNSS receiver may receive a GNSS signal to obtain positional information indicating a geographical position of the UE 100. The GNSS receiver outputs the GNSS signal to the controller 130. The UE 100 may include a global positioning system (GPS) function for acquiring the positional information of the UE 100.

In the present specification, for the sake of convenience, a process that is performed by at least one of the receiver 110, the transmitter 120, and the controller 130 provided in the UE 100 is described as a process (operation) that is performed by the UE 100.

(Base Station)

Figure 5:
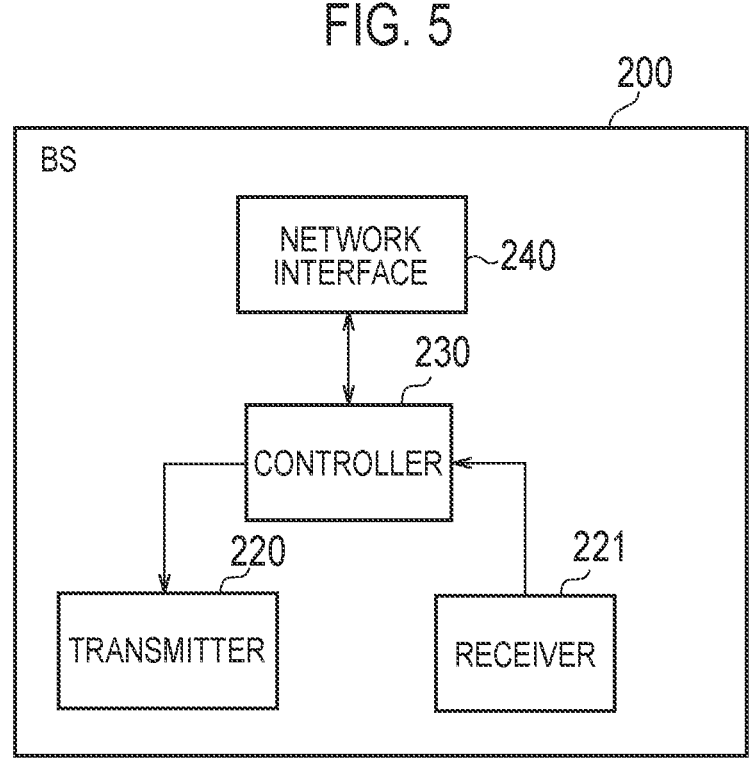
FIG. 5 is a block diagram of a BS 200.

A description will be given of the BS 200 (base station) according to the embodiment. FIG. 5 is a block diagram of the BS 200. As illustrated in FIG. 5, the BS 200 includes a receiver 210, a transmitter 220, a controller 230, and a network interface 240. The transmitter 210 and the receiver 220 may be an integrated transceiver.

The receiver 210 performs various types of reception under control of the controller 230. The receiver 210 includes an antenna. The receiver 210 converts a radio signal received by the antenna into a baseband signal (reception signal). The receiver 210 outputs the baseband signal to the controller 230.

The transmitter 220 performs various types of transmission under control of the controller 230. The transmitter 220 includes an antenna. The transmitter 220 converts the baseband signal (transmission signal) output by the controller 230 into a radio signal. The transmitter 220 transmits the radio signal from the antenna.

The controller 230 performs various types of control at the BS 200. The controller 230 includes a processor and a memory. The memory stores programs to be executed by the processor, and information to be used in processing by the processor. The processor includes a baseband processor and a CPU. For example, the baseband processor performs modulation/demodulation and coding/decoding of a baseband signal. The CPU performs various processes by executing the programs stored in the memory. The processor executes various processes described later and various communication protocols described above.

The network interface 240 is connected to an adjacent BS 200 via the X2 interface. The network interface 240 is connected to the MME 300 and the SGW 400 via the S1 interface. For example, the network interface 240 is used for communication performed on the X2 interface and communication performed on the S1 interface.

In the present specification, for the sake of convenience, a process that is performed by at least one of the transmitter 210, the receiver 220, the controller 230, or the network interface 240 provided in the BS 200 is described as a process (operation) that is performed by the BS 200.

(Network Apparatus)

Figure 6:
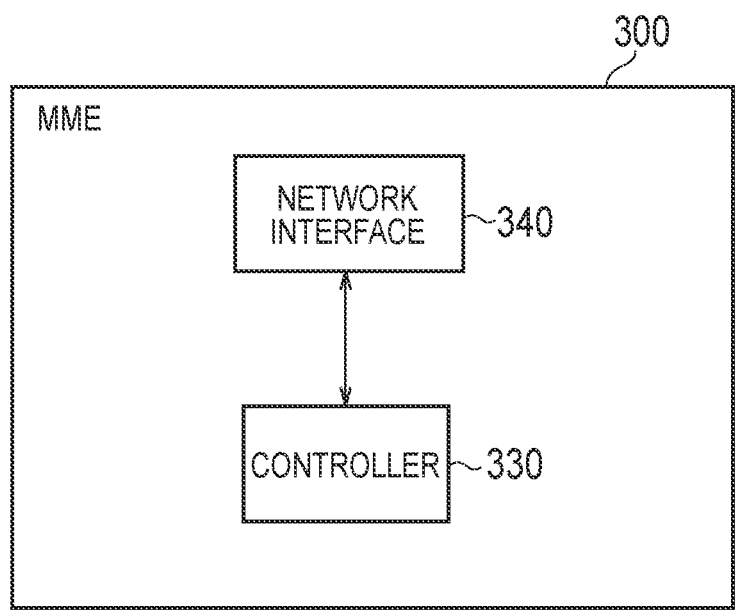
FIG. 6 is a block diagram of an MME 300.

The network apparatus according to the embodiment will be described. FIG. 6 is a block diagram of the MME 300. FIG. 6 is an example of the network apparatus included in the core network (for example, EPC 20). Since the other network apparatus (for example, SGW 400) has the same configuration as the MME 300, the description thereof will be omitted. The network apparatus may have the functions of the MME 300 and the SGW 400.

As illustrated in FIG. 6, the MME 300 includes a controller 330 and a network interface 340.

The controller 330 performs various control in the MME 300. The controller 330 includes a processor and a memory. The memory stores a program executed by the processor, and information to be used in processing by means of the processor. The processor includes a baseband processor and a CPU. For example, the baseband processor performs modulation, demodulation, coding, decoding, and the like of the baseband signal. The CPU performs various processing by executing the program stored in the memory. The processor performs various processing to be described below and the various communication protocols described above.

The network interface 340 is connected to another node (BS 200 and/or another network apparatus) via a predetermined interface. The network interface 340 is used for communication with another network apparatus which is performed through the predetermined interface.

In the present specification, processing performed by at least one of the controller and the network interface included in the network apparatus will be described as processing (operations) performed by the network apparatus for the sake of convenience in description.

First Embodiment

Operations (operation example 1 and operation example 2) according to a first embodiment will be described.

Operation Example 1

Figure 7:
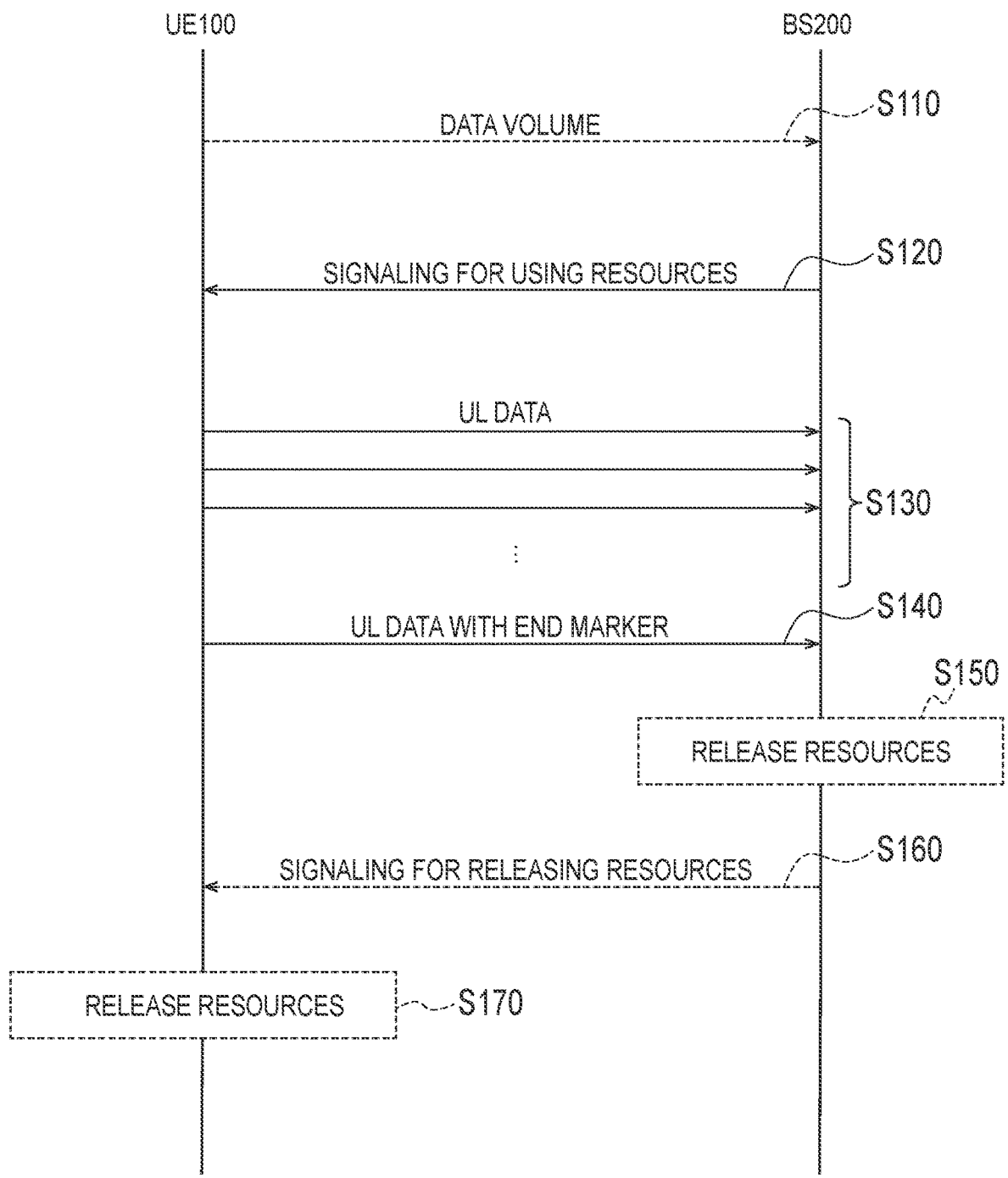
FIG. 7 is a sequence diagram for describing Operation Example 1 of a first embodiment.
Figure 8:
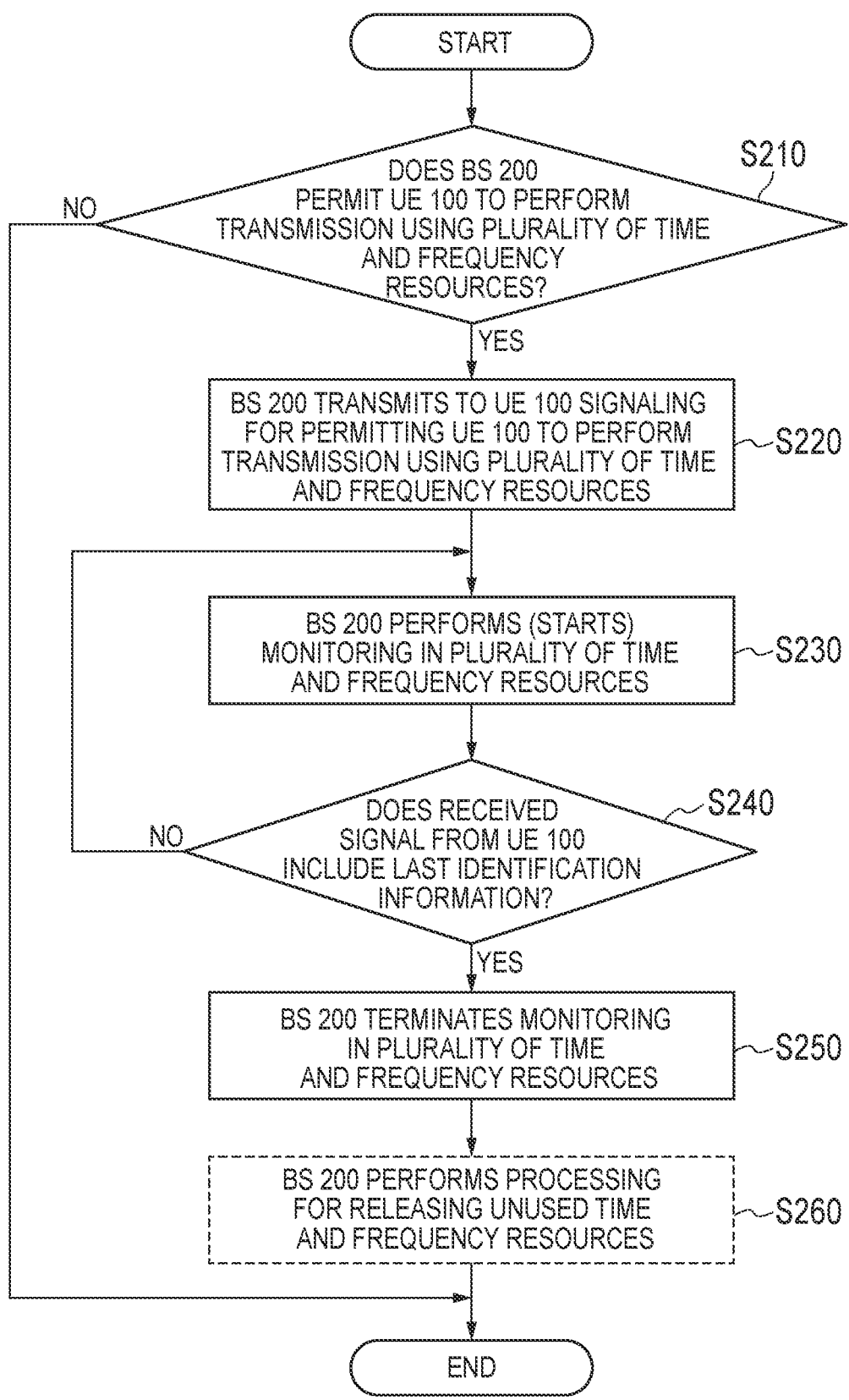
FIG. 8 is a flowchart for describing an operation of the BS 200 according to Operation Example 1 of the first embodiment.
Figure 9:
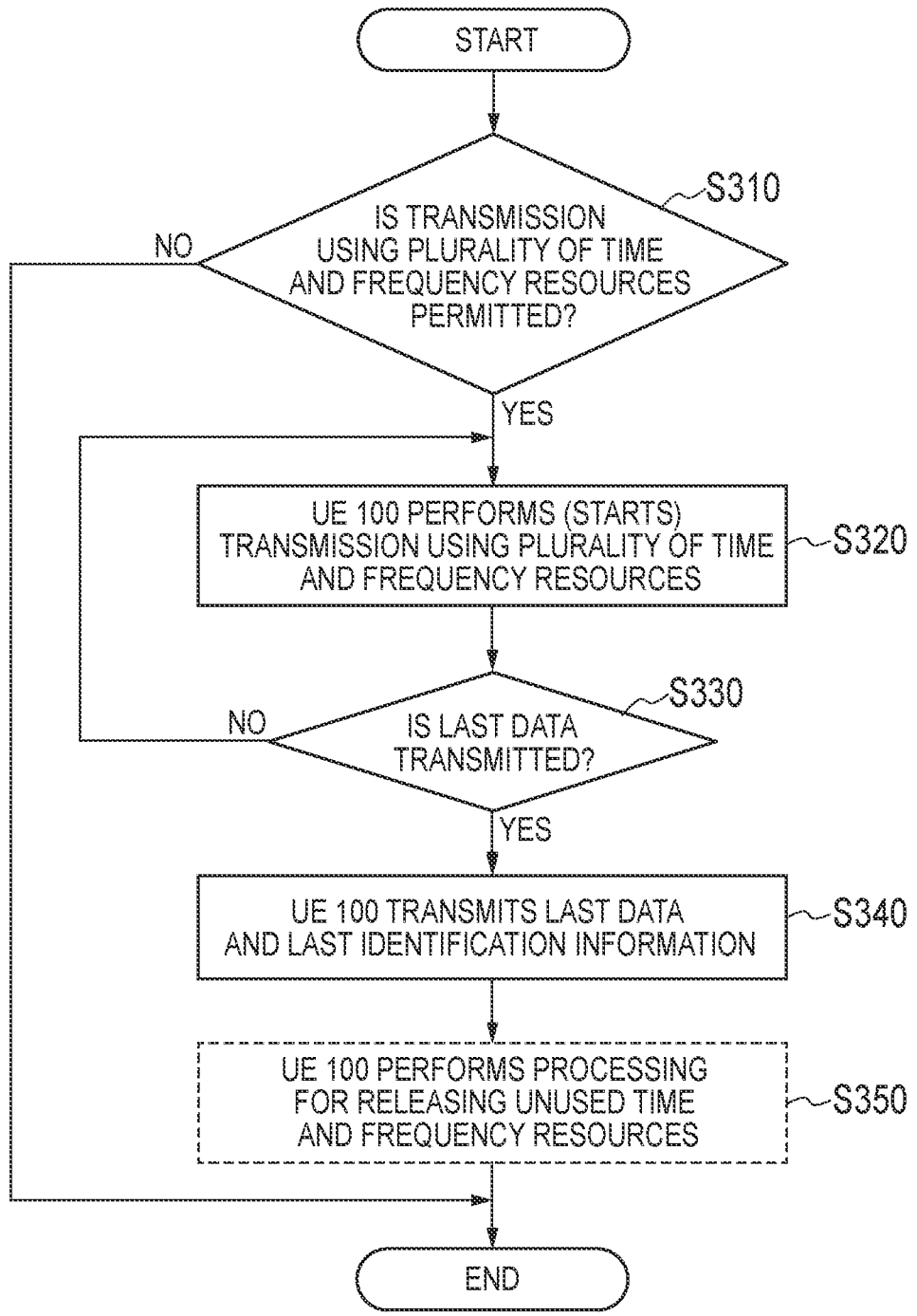
FIG. 9 is a flowchart for describing an operation of the UE 100 according to Operation Example 1 of the first embodiment.
Figure 10:
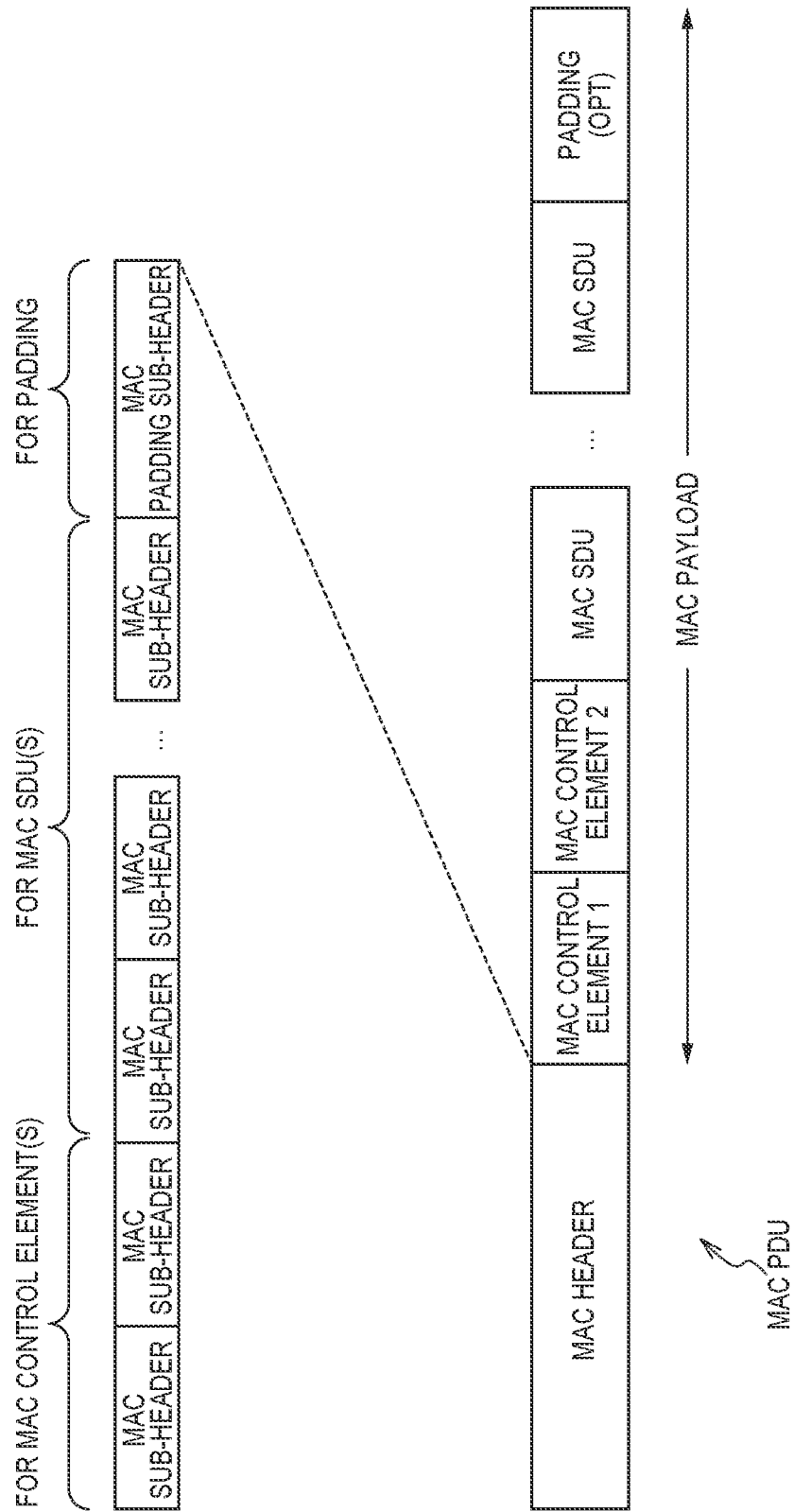
FIG. 10 is a diagram for describing Operation Example 1 of the first embodiment.

Operation Example 1 will be described with reference to FIGS. 7 to 10. FIG. 7 is a sequence diagram for describing Operation Example 1 of the first embodiment. FIG. 8 is a flowchart for describing an operation of the BS 200 according to Operation Example 1 of the first embodiment. FIG. 9 is a flowchart for describing an operation of the UE 100 according to Operation Example 1 of the first embodiment. FIG. 10 is a diagram for describing Operation Example 1 of the first embodiment.

Operation Example 1 is a case where the UE 100 transmits data to the BS 200 (E-UTRAN 10) by using the plurality of time and frequency resources.

In FIG. 7, the UE 100 is present in a range in which signaling from the BS 200 is received. For example, the UE 100 exists in the cell managed by the BS 200. The UE 100 is present within a coverage or coverage enhancement (CE) of the cell. An example of a case where the UE 100 is in an RRC inactive state will be described. The RRC inactive state is an intermediate state between the RRC connected state and the RRC idle state. The RRC inactive state is an RRC state applied when data transmission and reception is (temporarily) inactive, and the present invention is not limited thereto.

As illustrated in FIG. 7, in step S110, the UE 100 may transmit information (Data Volume) indicating the amount of communication data to the BS 200.

The information indicating the amount of communication data may be buffer status report (BSR) indicating the amount of data capable of being used for transmission. The BSR may include a buffer size and a logical channel group identifier associated with the buffer size. The buffer size is information for identifying the total amount of data capable of being used over all logical channels of a logical channel group.

The information indicating the amount of communication data may be the amount of communication data calculated based on (an identifier of) an application used (or started to be used) by the UE 100. The information indicating the amount of communication data may be the identifier of the application used (or started to be used) by the UE 100.

The BS 200 determines whether or not to permit the UE 100 to perform the transmission using the plurality of time and frequency resources (S210 of FIG. 8).

The plurality of time and frequency resources are radio resources which are allocated in order to transmit UL data to the BS 200 and are arranged in the time direction. The plurality of time and frequency resources may be radio resources which are arranged to each of the plurality of subframes. That is, the plurality of time and frequency resources may include time and frequency resources arranged within a first subframe and time and frequency resources arranged within a second subframe (later than the first subframe). The plurality of time and frequency resources may include time and frequency resources included in the plurality of subframes. The plurality of time and frequency resources may include only time and frequency resources included in one subframe.

The BS 200 may determine whether or not to permit the UE 100 to perform the transmission using the plurality of time and frequency resources based on the information indicating the amount of communication data from the UE 100. When the amount of communication data exceeds a threshold, the BS 200 may determine to permit the UE 100 to perform the transmission. When the amount of communication data is equal to or less than the threshold, the BS 200 may determine not to permit the UE 100 to perform the transmission. For example, the threshold may be a value indicating (the maximum value of) the amount of time and frequency resources capable of being allocated to the UE 100 by one scheduling information (for example, uplink (UL) grant).

In step S210, when it is necessary to allocate the time and frequency resources to the UE 100 across the plurality of subframes (with consideration for a use situation of the radio resources in the BS 200), the BS 200 may determine to permit the UE 100 to perform the transmission. When the UE 100 can sufficiently transmit user data by using the time and frequency resources within one subframe, the BS 200 may determine not to permit the UE 100 to perform the transmission.

When traffic from the UE 100 is predicted to be serially (continuously) generated, the BS 200 may determine to permit the UE 100 to perform the transmission. When the traffic from the UE 100 is predicted not to be serially (continuously) generated (that is, temporary traffic is generated), the BS 200 may determine not to permit the UE 100 to perform the transmission. For example, the BS 200 may predict whether or not the traffic from the UE 100 is to be serially (continuously) generated based on the identifier of the application. For example, when the application uses voice (call) and/or video (for example, Voice over LTE (VoLTE)), the BS 200 may predict that the traffic from the UE 100 is to be serially (continuously) generated. Otherwise, the BS 200 may predict that the traffic from the UE 100 is not to be serially (continuously) generated. When the traffic from the UE 100 has already generated serially, the BS 200 may determine to permit the UE 100 to perform the transmission using the plurality of time and frequency resources.

In response to determining that the UE 100 is permitted to perform the transmission using the plurality of time and frequency resources (S210: YES), the BS 200 can perform processing of step S120.

In response to determining that the UE 100 is not permitted to perform the transmission using the plurality of time and frequency resources (S210: NO), the BS 200 may terminate the processing. In this case, the BS 200 may perform dynamic scheduling for allocating the time and frequency resources within one subframe to the UE 100 as usual.

In step S120, the BS 200 (individually) transmits, to the UE 100, signaling (Signaling for using resources) for permitting the UE 100 to perform the transmission using the plurality of time and frequency resources (S220 of FIG. 8).

For example, the BS 200 may perform semi-persistent scheduling (SPS). That is, the BS 200 may allocate semi-persistent uplink resources to the UE 100. In this case, the BS 200 may individually transmit, to the UE 100, SPS configuration (SPS-Config) (for the uplink) used for specifying semi-persistent scheduling configuration. When the SPS configuration is individually transmitted, the BS 200 may transmit, to the UE 100, signaling (downlink control information (DCI)/uplink (UL) grant) for enabling (activating) the SPS configuration by using a temporary identifier (SPS C-RNTI) included in the SPS configuration.

The BS 200 may transmit, to the UE 100, an identifier (determination identifier) to be used by the UE 100 in order to determine whether or not to transmit last identification information (end marker) indicating the transmission of the last data through the signaling. For example, the BS 200 may add the determination identifier to the SPS configuration. The determination identifier may indicate that the UE 100 is to transmit the last identification information (is permitted to transmit the last identification information). The determination identifier may indicate that the UE 100 is not to transmit the last identification information (is not permitted to transmit the last identification information). Accordingly, the BS 200 ascertains whether or not the UE 100 that performs the SPS configuration transmits the last identification information.

For example, the BS 200 may perform multi-subframe scheduling as the dynamic scheduling. In this case, the BS 200 may allocate the time and frequency resources in each of the plurality of subframes to the UE 100. The BS 200 may transmit, to the UE 100, the scheduling information (UL grant) indicating the time and frequency resources allocated to the UE 100. The BS 200 may add the determination identifier to the scheduling information.

In response to the reception of the signaling from the BS 200 in step S120, the UE 100 determines whether or not the transmission using the plurality of time and frequency resources is permitted (S310 of FIG. 9). When the signaling is received from the BS 200, the UE 100 can determine that the transmission using the plurality of time and frequency resources is permitted.

The UE 100 receives (decodes) the signaling (DCI) for enabling the SPS configuration by using the SPS C-RNTI. After the SPS configuration is enabled, the UE 100 considers that an N-th grant is generated in a subframe satisfying the following condition (that is, the time and frequency resources in this subframe are permitted to be used).

$$(10*SFN+subframe)=[(10*SFN_{start\ time}+subframe_{start\ time})\ N*semiPersistSchedIntervalUL+Subframe\_Offset*(N\ modulo\ 2)]modulo\ 10240$$

"$SFN_{start\ time}$" is a system frame number (SFN) when the configured UL grant is (re)started. "$subframe_{start\ time}$" is a subframe when the configured UL grant is (re)started. "semiPersistSchedIntervalUL" indicates a semi-persistent scheduling interval (a value indicating the number of subframes) in the uplink.

When the signaling is not received from the BS 200, the UE 100 may determine that the transmission using the plurality of time and frequency resources is not permitted. In response to the reception of usual scheduling information indicating the time and frequency resources within one subframe, the UE 100 may determine that the transmission using the plurality of time and frequency resources is not permitted. In response to determining that the transmission is not permitted (S310: NO), the UE 100 may terminate the processing. The UE 100 may transmit the UL data (user data) by using the time and frequency resources indicated by the scheduling information.

In step S130, in response to determining that the transmission is permitted (S310: YES), the UE 100 performs (starts) the transmission using the plurality of time and frequency resources (S320 of FIG. 9).

When the SPS configuration is enabled, the UE 100 may transmit the data to the BS 200 by using the time and frequency resources in each of the plurality of subframes in which the UL grant is generated. When the time and frequency resources in each of the plurality of subframes are allocated from the BS 200, the UE 100 transmits the data to the BS 200 by using the allocated time and frequency resources.

The UE 100 determines whether or not the last data is transmitted (S330 of FIG. 9). In response to determining that the last data is transmitted, the UE 100 performs processing of step S140.

For example, when the last MAC service data unit (SDU) is used at the time of generating a MAC protocol data unit (PDU), the UE 100 may determine that the last data is transmitted.

When transmission data (packet) is not present in a higher layer (for example, at least one of RRC, PDCP, RLC, and MAC) within the UE 100 by transmitting the transmission data (packet) to a lower layer from the higher layer, the UE 100 may determine that the last data is transmitted.

When the amount of data capable of being used for the transmission which is retained in the buffer is less than (a threshold indicating) the amount of data capable of being transmitted at one time, the UE 100 may determine that the last data is transmitted (in the next transmission).

The UE 100 may predict whether or not new data to be transmitted to the BS 200 is to be (immediately) generated after the last data is transmitted in order to ultimately determine whether or not to transmit last identification information to be described below. For example, in response to determining that the last data is transmitted, the UE 100 may predict whether or not the new data is to be generated during a predetermined period. The predetermined period is a period starting from when the last data is transmitted.

For example, the UE 100 may predict that the new data is not to be generated during the predetermined period in response to the termination of the application. The UE 100 may predict that the new data is to be generated during the predetermined period in response to determining that the application is continued.

The UE 100 may perform the processing of step S140 in response to the prediction. Specifically, only when the UE 100 determines that the last data is transmitted and predicts that the new data is not to be generated during the predetermined period after the last data is transmitted, the UE 100 may perform the processing of step S140. When the UE 100 predicts that the new data is to be generated during the predetermined period even though the UE 100 determines that the last data is transmitted, the UE 100 may not perform the processing of step S140. That is, the UE 100 may transmit the last data to the BS 200 without transmitting the last identification information.

Accordingly, the UE 100 can avoid the generation of the new data immediately after the last data is transmitted even though the last identification information is transmitted. Since the generated new data can be transmitted by using the already allocated time and frequency resources, the UE 100 can omit requesting the BS 200 to allocate the time and frequency resources for transmitting the new data.

The UE 100 may determine whether or not unused time and frequency resources are present among the plurality of time and frequency resources allocated to the UE 100.

When signaling for releasing and/or disabling (deactivating) the SPS configuration is received from the BS 200, the UE 100 may determine that the unused time and frequency resources are not present. When the SPS configuration is enabled, the UE 100 may determine that the unused time and frequency resources are present.

When the last data is transmitted by using the time and frequency resources in the last subframe allocated through the multi-subframe scheduling, the UE 100 may determine that the unused time and frequency resources are not present. When (time and frequency resources within) the subframe later than a subframe used for the transmission of the last data are allocated, the UE 100 may determine that the unused time and frequency resources are present.

When the UE 100 determines that the last data is transmitted and the unused time and frequency resources are present, the UE 100 may perform the processing of step S140. Accordingly, when the new data is generated, the UE 100 can omit requesting the BS 200 to allocate the time and frequency resources.

The UE 100 may determine whether or not to transmit the last identification information based on the determination identifier in the processing of step S140. When the determination identifier is received from the BS 200, the UE 100 may determine to transmit the last identification information. When the determination identifier is not received from the BS 200, the UE 100 may determine not to transmit the last identification information.

In step S140, in response to determining that the last data is transmitted (S330: YES), the UE 100 may transmit, to the BS 200, the last data and the last identification information (end marker) indicating the transmission of the last data (S340 of FIG. 9).

The UE 100 may add the last identification information to the MAC PDU (see FIG. 10) including the last data (MAC SDU). Specifically, the UE 100 may add the last identification information to at least one of a MAC header (that is, MAC sub-header), MAC control element (CE), and the MAC SDU.

One bit within the MAC sub-header corresponding to the last data (MAC SDU) may be used as a flag for the end marker indicating the last identification information. For example, a case where the flag indicates "0" may indicate that the corresponding MAC SDU is not the last data. A case where the flag indicates "1" may indicate that the corresponding MAC SDU is the last data.

The UE 100 may transmit the last data and the last identification information to the BS 200 by using the last identification information as the data (MAC SDU). The UE 100 may transmit the data and the last identification information to the BS 200 by the RRC message.

In response to determining that the last data is not transmitted (S330: NO), the UE 100 performs (continues) the transmission using the plurality of time and frequency resources.

Meanwhile, in response to the transmission of the signaling in step S120, the BS 200 performs (starts) monitoring in the plurality of time and frequency resources allocated to the UE 100 (S230 of FIG. 8).

The BS 200 receives the radio signal from the UE 100 through the monitoring. The BS 200 determines whether or not the received signal from the UE 100 includes the last identification information (S240 of FIG. 8). That is, the BS 200 determines the last identification information indicating whether the last data is transmitted. When the received signal from the UE 100 includes the last identification information, the BS 200 determines that the last data is transmitted. When the received signal includes the last identification information, the BS 200 can ascertain that the transmission of the data from the UE 100 is not performed in the subsequent time and frequency resources.

When the received signal from the UE 100 does not include the last identification information (S240: NO), the BS 200 determines that the transmission from the UE 100 using the plurality of time and frequency resources is continued (the last data is not transmitted).

In response to the reception of the last identification information, the BS 200 may terminate the monitoring in the plurality of time and frequency resources allocated to the UE 100. That is, in response to the inclusion of the last identification information in the received signal from the UE 100 (S240: YES), the BS 200 may terminate the monitoring (S250 of FIG. 8). The BS 200 can ascertain that the UE 100 does not have the data to be transmitted from the last identification information. Accordingly, since the BS 200 does not need to perform unnecessary monitoring, the BS 200 can achieve power saving.

When the received signal does not include the last identification information, the BS 200 performs (continues) the monitoring.

When the same time and frequency resources are allocated to another UE 100, even though the received signal from the UE 100 includes the last identification information, the BS 200 may perform the monitoring in the time and frequency resources in order to receive the radio signal from another UE 100.

In step S150, the BS 200 may perform processing for releasing (the unused time and frequency resources of) the plurality of time and frequency resources allocated to the UE 100 (S260 of FIG. 8). Accordingly, the BS 200 can allocate the released time and frequency resources to another UE 100. As a result, the utilization efficiency of the resources is improved.

The BS 200 may consider that the plurality of time and frequency resources allocated to the UE 100 is released. For example, the BS 200 may consider that the plurality of time and frequency resources allocated to the UE 100 is disabled. That is, the BS 200 may consider that the UE 100 retains the SPS configuration without discarding the SPS configuration.

The BS 200 may consider that the SPS configuration configured for the UE 100 is deconfigured. The BS 200 may consider that the SPS configuration configured for the UE 100 is discarded. The BS 200 may discard stored resource information, that is, information on the plurality of time and frequency resources in order to receive the radio signal from the UE 100.

The BS 200 may perform the processing of step S160 as the processing for releasing the resources. The BS 200 may perform the processing for implicitly releasing the plurality of time and frequency resources for the UE 100 without performing the processing of step S160.

In step S160, the BS 200 may transmit, to the UE 100, the signaling for releasing (the unused time and frequency resources of) the plurality of time and frequency resources.

For example, the BS 200 may transmit, to the UE 100, signaling (for example, RRC message) to be used by the UE 100 in order to deconfigure the SPS configuration. The BS 200 may transmit, to the UE 100, signaling (for example, PDCCH) to be used by the UE 100 in order to disable (deactivate) the SPS configuration.

The BS 200 may release the time and frequency resources allocated to the UE 100, that is, may perform the processing of step S150 after the transmission of the signaling in step S160.

In step S170, the UE 100 may perform the processing for releasing (the unused time and frequency resources of) the plurality of time and frequency resources (S350 of FIG. 9).

The UE 100 may perform the processing for releasing (the unused time and frequency resources of) the plurality of time and frequency resources in response to the signaling from the BS 200. In response to the reception of the signaling for releasing the SPS configuration, the UE 100 may deconfigure or discard the SPS configuration. In response to the reception of the signaling for disabling the SPS configuration, the UE 100 may disable the SPS configuration. In this case, the UE 100 saves the SPS configuration without discarding the SPS configuration.

In response to the transmission of the last identification information, the UE 100 may perform the processing for releasing (unused time and frequency resources of) the plurality of time and frequency resources. For example, since the UE 100 can release the time and frequency resources without transmitting empty data in order to implicitly release the resources, the UE 100 can improve the utilization efficiency of the time and frequency resources.

In response to the transmission of the last identification information, the UE 100 may deconfigure or discard the SPS configuration. In response to the transmission of the last identification information, the UE 100 may disable the SPS configuration.

As stated above, when the plurality of time and frequency resources arranged in the time direction is allocated, the UE 100 can transmit the last data and the last identification information. Accordingly, the BS 200 can ascertain that the last data from the UE 100 is transmitted. As a result, the BS 200 can omit monitoring in the time and frequency resources allocated to the UE 100.

The BS 200 can allocate the time and frequency resources allocated to the UE 100 to another UE 100. Accordingly, it is possible to improve the utilization efficiency of the time and frequency resources.

Operation Example 2

Figure 11:
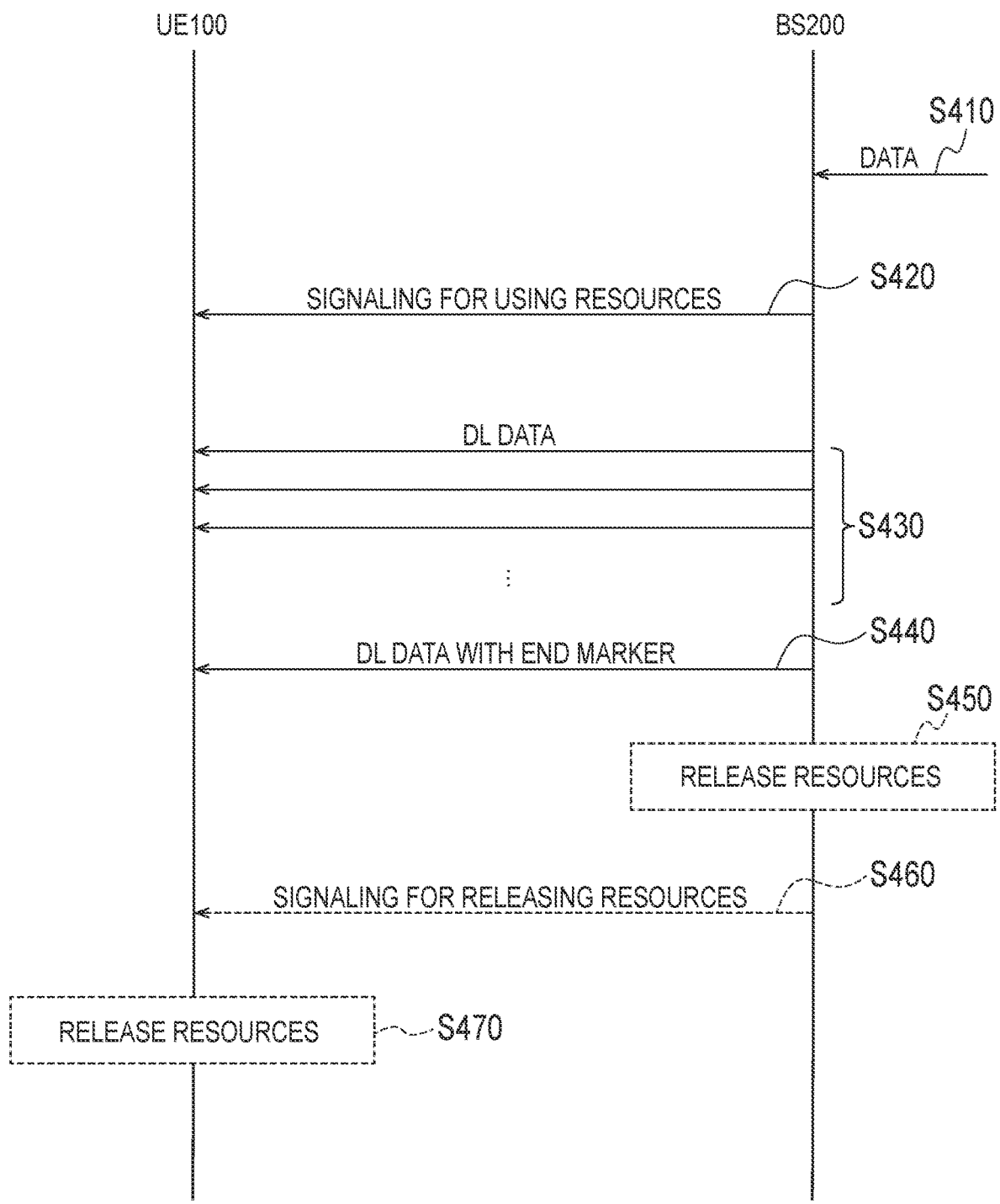
FIG. 11 is a sequence diagram for describing Operation Example 2 of the first embodiment.
Figure 12:
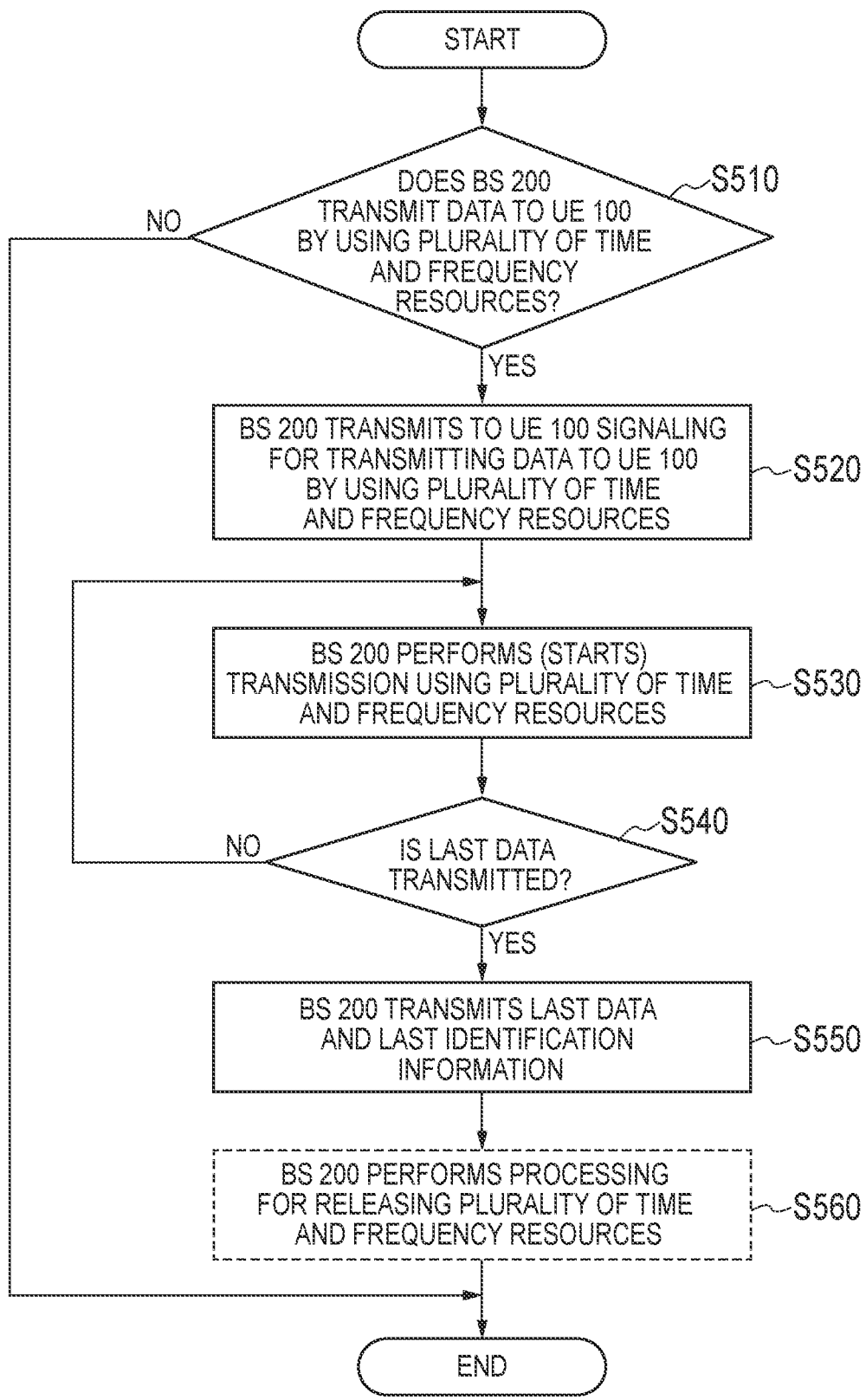
FIG. 12 is a flowchart for describing an operation of the BS 200 according to Operation Example 2 of the first embodiment.
Figure 13:
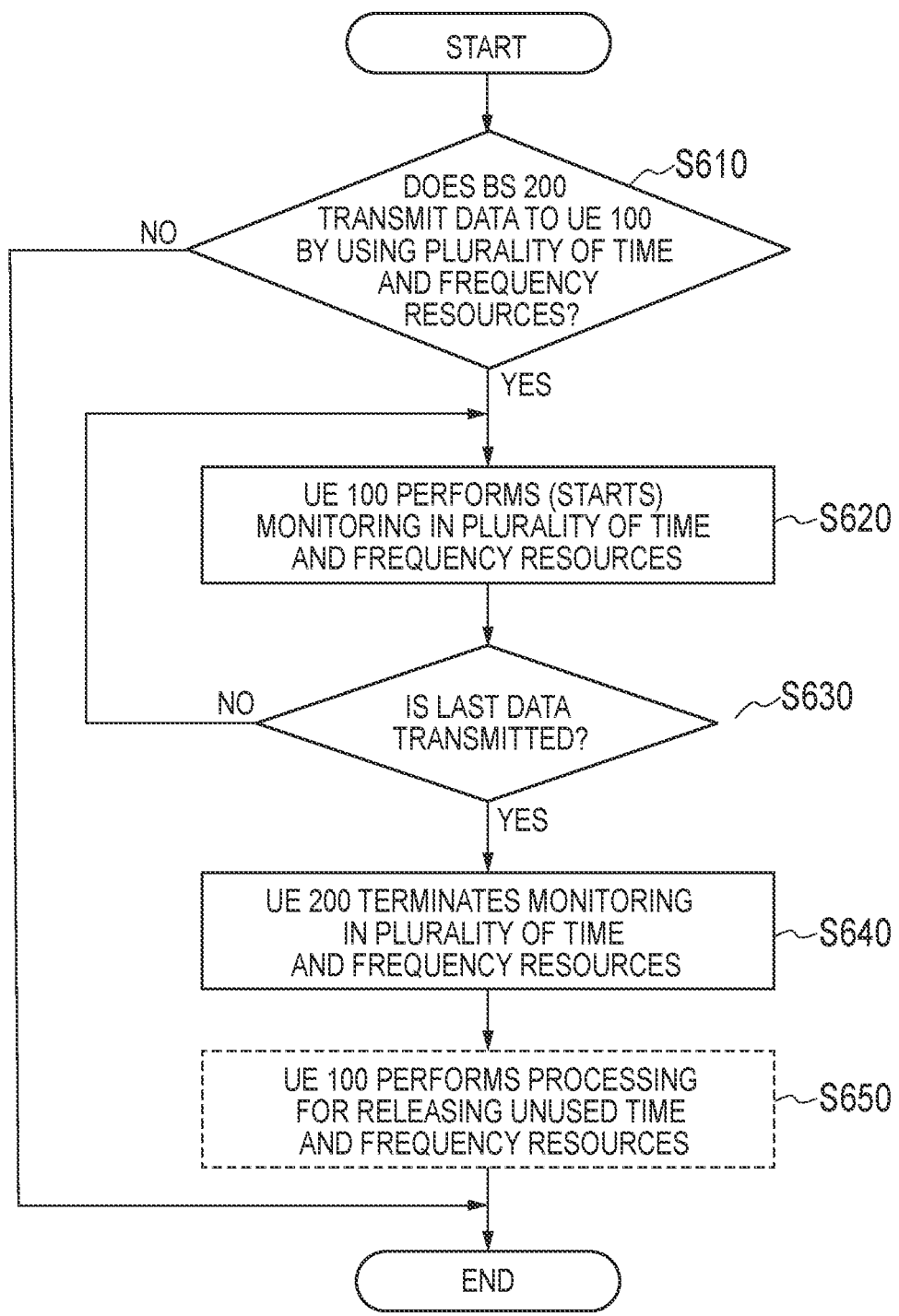
FIG. 13 is a flowchart for describing an operation of the UE 100 according to Operation Example 2 of the first embodiment.

Operation Example 2 will be described with reference to FIGS. 11 to 13. FIG. 11 is a sequence diagram for describing Operation Example 2 of the first embodiment. FIG. 12 is a flowchart for describing an operation of the BS 200 according to Operation Example 2 of the first embodiment. FIG. 13 is a flowchart for describing an operation of the UE 100 according to Operation Example 2 of the first embodiment. The description of the same portions as the portions described above will be omitted.

Operation Example 2 is a case where the BS 200 transmits the data to the UE 100 by using the plurality of time and frequency resources.

As illustrated in FIG. 11, in step S410, the BS 200 may receive the data (DL data) to be transmitted to the UE 100 from the higher network (for example, SGW 400).

The BS 200 determines whether or not to transmit the data to the UE 100 by using the plurality of time and frequency resources (S510 of FIG. 12). In response to the reception of the data to be transmitted to the UE 100, the BS 200 may start the determination.

When the data is equal to or greater than a threshold, the BS 200 may determine to perform the transmission. When the data is less than the threshold, the BS 200 may determine not to perform the transmission. The threshold may be, for example, a value indicating (the maximum value of) the amount of time and frequency resources capable of being allocated to the UE 100 by using one scheduling information (for example, downlink (DL) grant).

When it is necessary to allocate the time and frequency resources to the UE 100 across the plurality of subframes (with consideration for the use situation of the radio resources in the BS 200), the BS 200 may determine to perform the transmission. When the UE 100 can sufficiently transmit the user data by using the time and frequency resources within one subframe, the BS 200 may determine not to perform the transmission.

When traffic to the UE 100 is predicted to be serially generated, the BS 200 may determine to permit the transmission. When the traffic to the UE 100 is predicted not to be serially generated, the BS 200 may determine not to permit the UE 100 to perform the transmission. For example, the BS 200 may predict whether or not the traffic to the UE 100 is to be serially generated based on the identifier of the application obtained from the UE 100. When the traffic from the UE 100 has already generated serially, the BS 200 may determine to perform the transmission.

In response to determining that the data is transmitted to the UE 100 by using the plurality of time and frequency resources (S510: YES), the BS 200 can perform processing of step S420.

In response to determining that the transmission is not performed (S510: NO), the BS 200 may terminate the processing. The BS 200 may perform dynamic scheduling for allocating the time and frequency resources within one subframe to the UE 100 as usual.

In step S420, the BS 200 can (individually) transmit, to the UE 100, signaling (Signaling for using resources) for transmitting the data to the UE 100 by using the plurality of time and frequency resources (S520 of FIG. 12).

For example, the BS 200 may allocate semi-persistent downlink resources to the UE 100. The BS 200 may individually transmit the SPS configuration (for the downlink) to the UE 100. The BS 200 may transmit the signaling for enabling the SPS configuration by using the temporary identifier included in the SPS configuration. The BS 200 may transmit the determination identifier to the UE 100 through the signaling. For example, the BS 200 may add the determination identifier to the SPS configuration. The determination identifier may indicate that the BS 200 transmits the last identification information. The determination identifier may indicate that the BS 200 does not transmit the last identification information. Accordingly, the UE 100 ascertains whether or not the BS 200 transmits the last identification information.

The BS 200 may allocate the time and frequency resources in each of the plurality of subframes to the UE 100 (multi-subframe scheduling). The BS 200 may transmit, to the UE 100, the scheduling information (DL grant) indicating the time and frequency resources allocated to the UE 100. The BS 200 may add the determination identifier to the scheduling information.

The UE 100 can determine whether or not the BS 200 transmits the data to the UE 100 by using the plurality of time and frequency resources (S610 of FIG. 13).

When the signaling is received from the BS 200, the UE 100 can determine that the BS 200 transmits the data to the UE 100 by using the plurality of time and frequency resources.

The UE 100 receives (decodes) the signaling for enabling the SPS configuration by using the SPS C-RNTI. After the SPS configuration is enabled, the UE 100 considers that the N-th grant is generated in the subframe satisfying the following condition (that is, determines to monitor the time and frequency resources in this subframe).

$$(10*SFN+\text{subframe}) = [(10*SFN_{start\ time} + \text{subframe}_{start\ time}) + N*\text{semiPersistSchedIntervalDL}] \text{modulo } 10240$$

"$SFN_{start\ time}$" is a system frame number (SFN) when the configured UL grant is (re)started. "$\text{subframe}_{start\ time}$" is a subframe when the configured UL grant is (re)started. "semiPersistSchedIntervalDL" is a semi-persistent scheduling interval (a value indicating the number of subframes) in the downlink.

When the signaling is not received from the BS 200, the UE 100 may determine that the BS 200 does not transmit the data to the UE 100 by using the plurality of time and frequency resources. In response to determining that the BS 200 does not transmit the data to the UE 100 by using the plurality of time and frequency resources (S610: NO), the UE 100 may terminate the processing.

In step S430, in response to determining that the transmission is performed (S610: NO), the BS 200 performs (starts) the transmission using the plurality of time and frequency resources (S530 of FIG. 12).

The BS 100 determines whether or not the last data is transmitted (S540 of FIG. 12). The determination method is the same as the determination method of Operation Example 1.

The BS 100 may determine whether or not the unused time and frequency resources are present among the plurality of time and frequency resources allocated to the UE 100.

When the signaling for releasing and/or disabling (deactivating) the SPS configuration is transmitted to the UE 100, the BS 200 may determine that the unused time and frequency resources are not present. When the last data is transmitted by using the time and frequency resources in the last subframe allocated through the multi-subframe scheduling, the BS 200 may determine that the unused time and frequency resources are not present. Otherwise, the BS 100 may determine that the unused time and frequency resources are present.

In step S440, in response to determining the last data is transmitted (S540: YES), the BS 200 may transmit, to the UE 100, the last data and the last identification information (end marker) indicating the transmission of the last data (S550 of FIG. 12). The transmission method of the last identification information is the same as the transmission method of Operation Example 1.

The BS 200 may determine whether or not to transmit the last identification information based on the determination identifier in the processing of step S440. When the determination identifier is transmitted to the UE 100, the BS 200 may determine to transmit the last identification information. When the determination identifier is not transmitted to the UE 100, the BS 200 may determine not to transmit the last identification information.

In response to determining that the last data is not transmitted (S540: NO), the BS 200 performs (continues) the transmission using the plurality of time and frequency resources.

Meanwhile, in response to the reception of the signaling in step S420, the UE 100 performs (starts) the monitoring in the plurality of time and frequency resources allocated to the UE 100 (S620 of FIG. 13). That is, in response to determining that the BS 200 transmits the data to the UE 100 by using the plurality of time and frequency resources (S610: YES), the UE 100 performs (starts) the monitoring.

The UE 100 receives the radio signal from the BS 200 through the monitoring. Similarly to Operation Example 1, the UE 100 determines whether or not the last data is transmitted (S630 of FIG. 13). That is, the UE 100 determines whether or not the received signal from the BS 200 includes the last identification information. In response to determining that the last data is not transmitted (S630: YES), the UE 100 may terminate the monitoring in the plurality of time and frequency resources allocated to the UE 100 (S640 of FIG. 13).

In response to the reception of the last identification information, the UE 100 may determine that the monitoring in the plurality of time and frequency resources is not requested. In response to the reception of the last identification information, the UE 100 may terminate the monitoring in the plurality of time and frequency resources allocated to the UE 100.

Accordingly, since the UE 100 does not need to perform unnecessary monitoring, the UE 100 can achieve power saving.

When the received signal does not include the last identification information, the UE 100 performs (continues) the monitoring. That is, in response to determining that the last data is not transmitted (S630: NO), the UE 100 performs (continues) the monitoring.

In step S450, in response to the transmission of the last identification information, the BS 200 may perform the processing for releasing (the unused time and frequency resources of) the plurality of time and frequency resources allocated to the UE 100 (S560 of FIG. 13). Accordingly, the BS 200 can allocate the released time and frequency resources to another UE 100. As a result, the utilization efficiency of the resources is improved.

The BS 200 may perform the processing of step S460 as the processing for releasing the resources. The BS 200 may perform the processing for implicitly releasing the plurality of time and frequency resources for the UE 100 without performing the processing of step S460.

Similarly to Operation Example 1 described above, in step S460, the BS 200 may transmit, to the UE 100, the signaling for releasing (unused time and frequency resources of) the plurality of time and frequency resources.

In step S470, the UE 100 may perform the processing for releasing (unused time and frequency resources of) the plurality of time and frequency resources (S650 of FIG. 13).

The UE 100 may perform the processing for releasing (the unused time and frequency resources of) the plurality of time and frequency resources in response to the signaling from the BS 200. In response to the reception of the last identification information, the UE 100 may perform the processing for releasing the plurality of time and frequency resources.

As stated above, when the plurality of time and frequency resources arranged in the time direction is allocated to the UE 100, the BS 200 can transmit the last data and the last identification information. Accordingly, the UE 100 can ascertain that the last data is transmitted from the BS 200 to the UE 100. As a result, the UE 100 can omit monitoring in the time and frequency resources allocated to the UE 100.

The BS 200 can allocate the time and frequency resources allocated to the UE 100 to another UE 100. Accordingly, it is possible to improve the utilization efficiency of the time and frequency resources.

Second Embodiment

Figure 14:
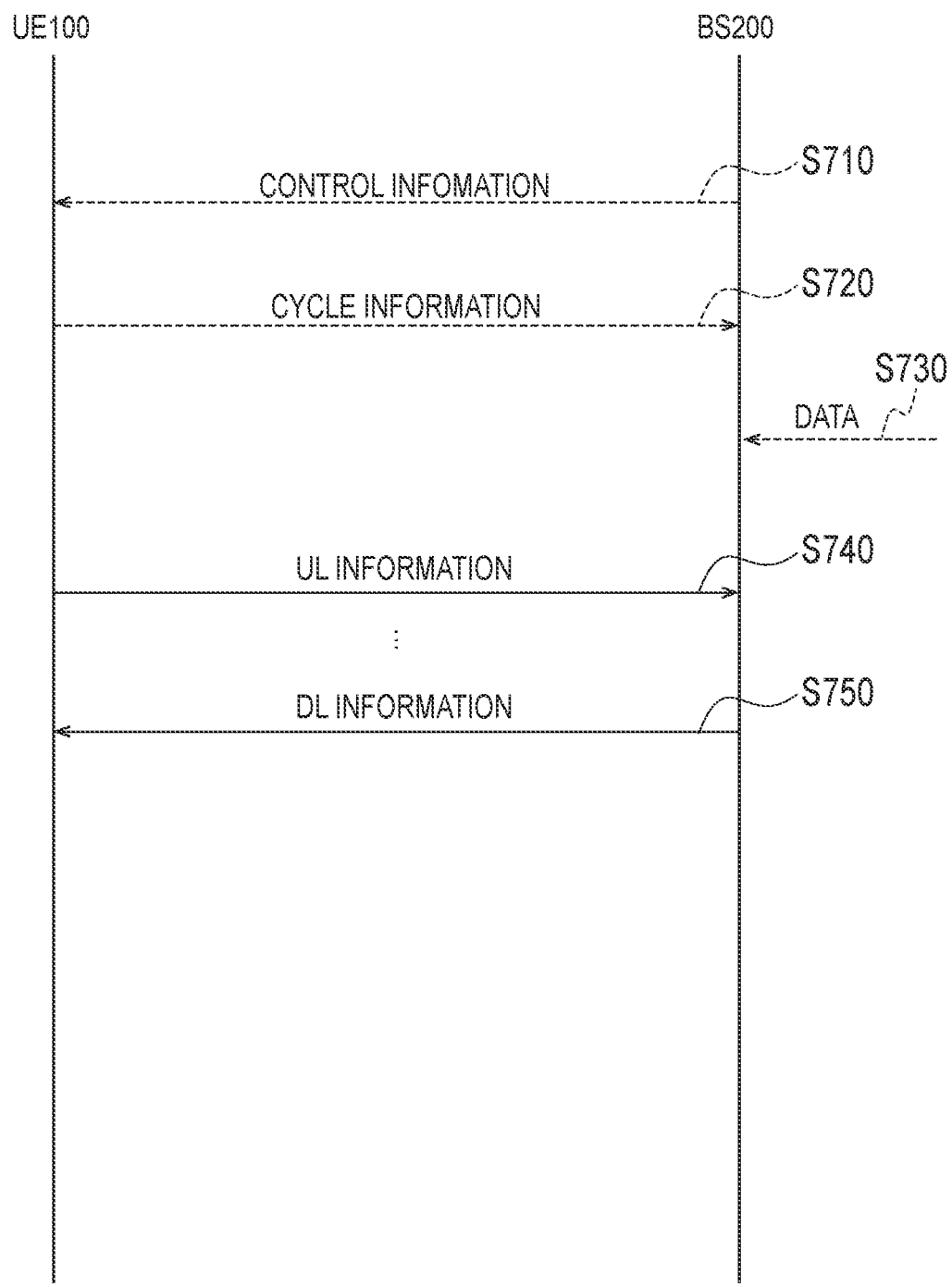
FIG. 14 is a sequence diagram for describing an operation example of a second embodiment.
Figure 15:
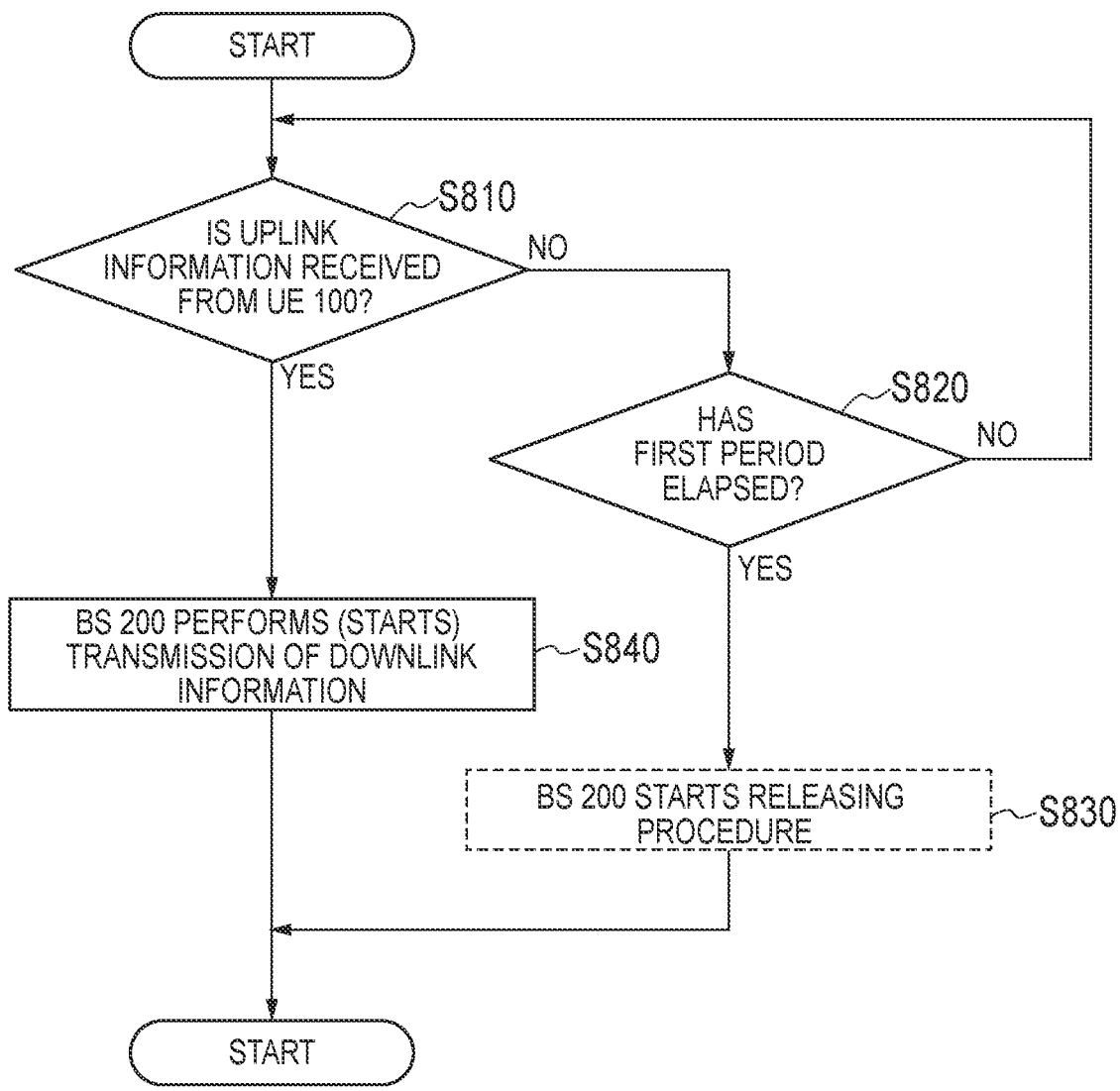
FIG. 15 is a flowchart for describing an operation of the BS 200 according to the operation example of the second embodiment.
Figure 16:
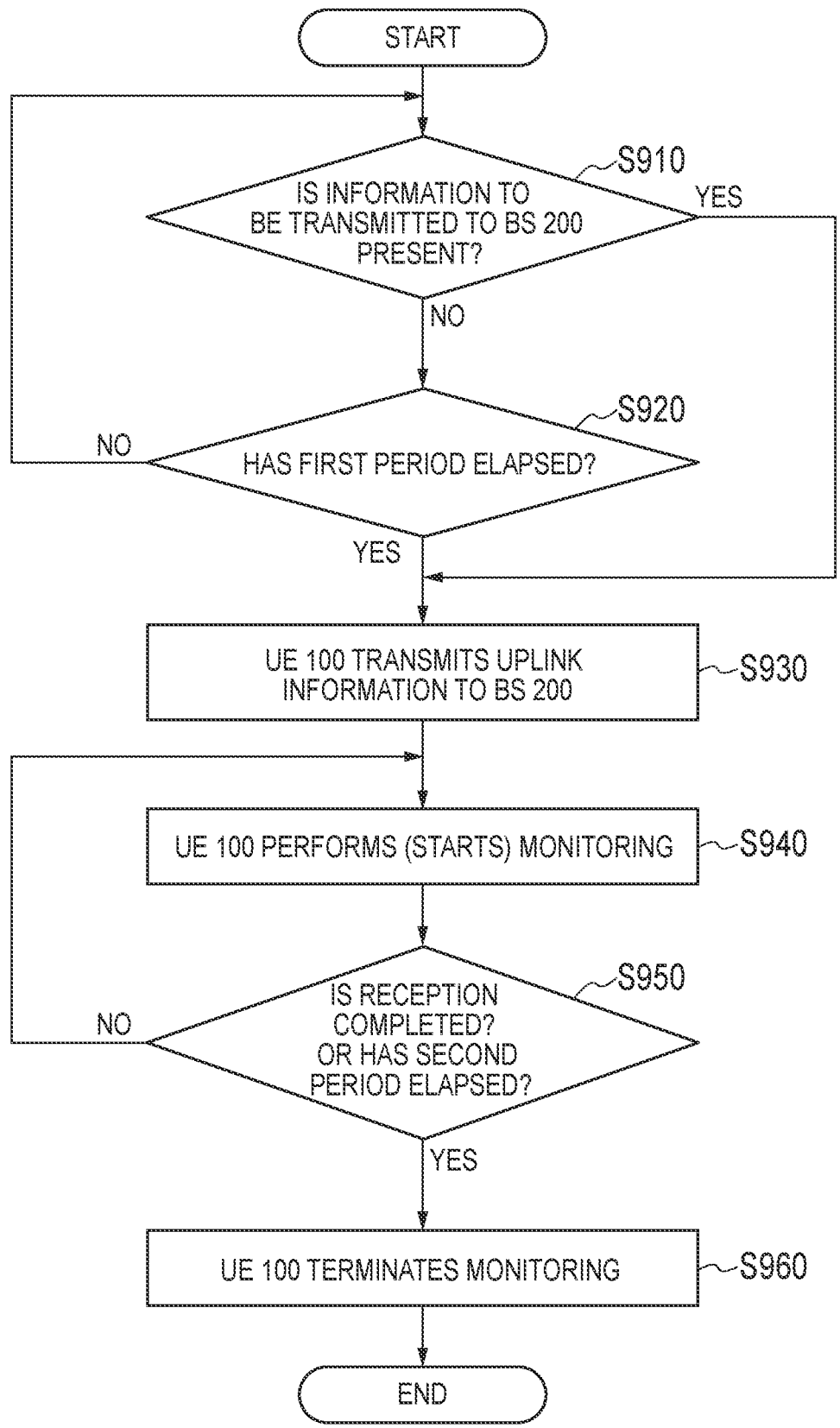
FIG. 16 is a flowchart for describing an operation of the UE 100 according to the operation example of the second embodiment.

An operation example according to a second embodiment will be described with reference to FIGS. 14 to 16. FIG. 14 is a sequence diagram for describing the operation example of the second embodiment. FIG. 15 is a flowchart for describing an operation of the BS 200 according to the operation example of the second embodiment. FIG. 16 is a flowchart for describing an operation of the UE 100 according to the operation example of the second embodiment. The description of the same portions as the portions described above will be omitted.

The second embodiment is a case where the network apparatus starts transmission of downlink information in response to reception of uplink information. Hereinafter, a case where the BS 200 is used as an example of the network apparatus will be described.

As illustrated in FIG. 14, the BS 200 may notify (transmit) the UE 100 of control information in step S710.

The control information may include information indicating an upper limit of a predetermined cycle at which the UE 100 is to transmit the uplink information (UL information) to the BS 200. The control information may include information indicating an upper limit of a first period based on the predetermined cycle. The first period may be equal to a time length of the predetermined cycle.

The control information may include information for configuring the predetermined cycle for the UE 100. The control information may include timer configuration (and/or timer value) for measuring the first period.

The control information may include time information for specifying a second period. The second period indicates a period when the UE 100 terminates the monitoring of the downlink information. The time information may be timer configuration (and/or timer value) for measuring the second period.

The BS 200 may transmit the control information to the UE 100 through individual signaling (for example, RRC connection reconfiguration message or the like). The BS 200 may transmit the control information to the UE 100 through broadcast signaling (for example, system information block (SIB))/group signaling.

In step S720, the UE 100 may notify the BS 200 of cycle information indicating the predetermined cycle. For example, the cycle information may indicate a cycle at which the UE 100 transmits the uplink information at least one time per day. The cycle information may indicate the first period.

The cycle information may information indicating the capability of the UE 100 (for example, UE category). The cycle information may be terminal information of the UE 100.

The UE 100 may determine the predetermined cycle based on the information indicating the upper limit of the predetermined cycle. The predetermined cycle may be defined in advance.

The BS 200 may ascertain the predetermined cycle at which the UE 100 is to transmit the uplink information to the BS 200 based on the cycle information received from the UE 100. The BS 200 may ascertain the predetermined cycle at which the UE 100 is to transmit the uplink information to the BS 200 based on the cycle information obtained from the higher network.

The predetermined cycle of the UE 100 may be defined in advance. The BS 200 can ascertain the predetermined cycle of the UE 100 even though the cycle information is not received from the UE 100.

In step S730, the BS 200 may receive information (data and/or control information) to be transmitted to the UE 100 from the higher network (for example, SGW 400). In response to the reception of the information, the BS 200 may determine that the downlink information to be transmitted to the UE 100 is generated. In response to the generation of the downlink information, the BS 200 may determine whether or not the uplink information is received from the UE 100 (S810 of FIG. 15).

When the downlink information is generated, the BS 200 retains the downlink information until the uplink information is received from the UE 100. That is, even though the downlink information is generated, when the uplink information is not received from the UE 100, the BS 200 does not transmit the downlink information to the UE 100.

Meanwhile, the UE 100 determines whether or not the information (data and/or control information) to be transmitted to the BS 200 is present (S910 of FIG. 16).

When the information to be transmitted to the BS 200 is present (YES: S910), the UE 100 may perform the processing of step S740 (S930 of FIG. 16). When a transmission timing for the BS 200 is defined in advance, the UE 100 may wait for the processing of step S740 to be performed up to the transmission timing.

When the information to be transmitted to the BS 200 is not present (S910: NO), the UE 100 may determine whether or not the first period based on the predetermined cycle has elapsed (S920 of FIG. 16).

The UE 100 may measure the first period. For example, in response to the transmission of the uplink information, the UE 100 may (re)initiate the first timer for measuring the first period. In response to the expiration of the first timer, the UE 100 may determine that the first period has elapsed.

When the first period has elapsed (S920: YES), the UE 100 may perform the processing of step S740 (S930 of FIG. 16). Accordingly, the UE 100 can transmit the uplink information to the BS 200 at the predetermined cycle at least one time. The UE 100 may transmit the uplink information at the predetermined cycle by multiple times.

When the first period has not elapsed (S920: NO), the UE 100 may perform the processing of step S910.

In step S740, the UE 100 can transmit the uplink information to the BS 200.

When the information to be transmitted to the BS 200 is present, the UE 100 transmits the information to the BS 200.

The UE 100 may not necessarily transmit the uplink information at the predetermined cycle at one time. Even when the information to be transmitted to the BS 200 is not present, the UE 100 may transmit the uplink information to the BS 200. For example, the uplink information may be dummy data. The uplink information may be information indicating that the transmission data is not present. The uplink information may be information indicating null.

In response to the transmission of the uplink information, the UE 100 performs (starts) the monitoring of the downlink information (S940 of FIG. 16). The UE 100 may stop the monitoring of the downlink information until the transmission of the uplink information is started. The UE 100 may not be requested (expected) to monitor the downlink information until the transmission of the uplink information is started. Accordingly, the UE 100 may determine whether or not to start the monitoring of the downlink information in a period before the uplink information is transmitted. The UE 100 may monitor the downlink information (if necessary) even before the transmission of the uplink information is started.

The UE 100 may terminate a discontinuous reception (DRX) sleep operation in which the monitoring of the downlink information is not received, as the operation for starting the monitoring of the downlink information. That is, the UE 100 may wake up from the DRX sleep operation, and may wait in order to receive the PDCCH.

The UE 100 may transition to a state in which the downlink information (for example, PDCCH) can be received (reception-on state) from a state in which the downlink information cannot be received (reception-off state). The UE 100 may switch from a DRX operation using a long DRX cycle to a DRX operation using a short DRX cycle as the operation for starting the monitoring the downlink information.

The UE 100 may start the monitoring of the downlink information after a third period has elapsed from the transmission of the uplink information. For example, the UE 100 may start monitoring in a subframe in which the third period has elapsed from the subframe in which the uplink information is transmitted. The time information may include information indicating an offset indicating the third period.

In response to the transmission of the uplink information, the UE 100 may measure the second period. For example, in response to the transmission of the uplink information, the UE 100 may initiate a second timer for measuring the second period when the UE 100 terminates the monitoring of the downlink information. The UE 100 may perform the monitoring of the downlink information during the initiating of the second timer.

The second timer may be an inactivity timer indicating a duration in a downlink subframe in which the UE 100 waits in order to decode the PDCCH.

The BS 200 receives the uplink information from the UE 100. When the uplink information is received, the BS 200 performs processing of step S750.

When the uplink information cannot be received (S810: NO), the BS 200 may determine whether or not the first period based on the predetermined cycle has elapsed (S820 of FIG. 15). The BS 200 may initiate the first timer in order to measure the first period. In response to the reception of the uplink information from the UE 100, the BS 200 may initiate the first timer.

When the first period has not elapsed as stated above (S820: NO), the BS 200 may perform processing of step S810.

When the uplink information is not received even though the first period has elapsed, the BS 200 may determine that an abnormal situation occurs in the UE 100.

When the uplink information is not received even though the first period has elapsed, the BS 200 may determine that the UE 100 is in an out-of-reach state (Unreachable). For example, the BS 200 may determine that the communication with the UE 100 is not possible. The BS 200 may determine that the UE 100 is moved from a communication area (cell) managed by the BS 200.

When the first period has elapsed (S820: YES), the BS 200 may start a releasing procedure (S830 of FIG. 15). That is, even though the first period based on the predetermined cycle has elapsed after the uplink information is received, when the next uplink information is not received from the UE 100, the BS 200 may perform a procedure for releasing the information of the UE 100.

For example, the BS 200 may discard the data to be transmitted to the UE 100 received in step S730.

The BS 200 may start a procedure (S1 UE Context Release Request) for releasing a context of the UE 100 (eNB triggered). Specifically, the BS 200 may send a request (S1 UE Context Release Request) for releasing the context of the UE 100 to the EPC 10 (MME 300). In response to the reception of the request, the MME 300 may release the context of the UE 100. In response to the reception of the request, the MME 300 may send a command (S1 UE Context Release Command) for releasing the context of the UE 100 in the BS 200. In response to the reception of the command, the BS 200 may release the context of the UE 100. The BS 200 may send a message indicating the completion of the releasing of the context of the UE 100 to the EPC 10 (MME 300).

In step S750, in response to the reception of the uplink information (S810: YES), the BS 200 performs (starts) the transmission of the downlink information (S840 of FIG. 15). The UE 100 receives the downlink information from the BS 200.

Before the downlink information is transmitted, the BS 200 may transmit, to the UE 100, a paging message used by the UE 100 in order to receive the downlink information. The BS 200 may transmit the downlink information after the paging message is transmitted to the UE 100.

When the information to be transmitted to the UE 100 is not retained, the BS 200 may transmit, to the UE 100, downlink information indicating that there is no information (storage information: DL data and/or control information) to be transmitted to the UE 100. The downlink information may include an identifier indicating that there is no storage information.

The UE 100 may determine whether or not the reception of all the downlink information to be transmitted to the UE 100 retained by the BS 200 is completed (S950 of FIG. 16). In response to a period for which the next downlink information is not received after the downlink information is received from the BS 200 last exceeding a threshold, the UE 100 may determine that the reception is completed. The UE 100 may determine that the reception is not completed in response to determining that the period is less than the threshold.

In response to the reception of the last identification information in the first embodiment, the UE 100 may determine that the reception of all the downlink information is completed. The UE 100 may determine that the reception of all the downlink information is not completed until the last identification information is received.

In response to the completion of the reception of all the downlink information (S950: YES), the UE 100 may terminate the monitoring of the downlink information (S960 of FIG. 16). Accordingly, the UE 100 can achieve power saving.

In response to determining that the reception of all the downlink information is not completed (S950: NO), the UE 100 performs (continues) the monitoring of the downlink information.

The UE 100 may determine whether or not the second period has elapsed after the monitoring is started (S950 of FIG. 16). In response to the expiration of the second timer, the UE 100 may determine that the second period has elapsed. In response to determining that the second timer is being initiated, the UE 100 may determine that the second period has not elapsed.

In response to determining that the second period has elapsed after the monitoring is started (S950: YES), the UE 100 may terminate the monitoring of the downlink information (S960 of FIG. 16). In response to the expiration of the second timer for measuring the second period, the UE 100 may terminate the monitoring of the downlink information.

In response to determining that the second period has not elapsed (S950: NO), the UE 100 performs (continues) the monitoring of the downlink information.

The UE 100 may start the DRX sleep operation as the operation for terminating the monitoring of the downlink information. The UE 100 may transition from the reception-on state to the reception-off state. The UE 100 may switch from the DRX operation using the short DRX cycle to the DRX operation using the long DRX cycle, as the operation for starting the monitoring of the downlink information.

When the monitoring of the downlink information is terminated, the UE 100 can continue to stop the monitoring of the downlink information until the transmission of the uplink information is started. Accordingly, the UE 100 can achieve power saving.

When the monitoring of the downlink information is terminated, the UE 100 may perform the processing of step S910.

As stated above, since the UE 100 transmits the uplink information to the BS 200 at the predetermined cycle at least one time, even when the BS 200 starts the transmission of the downlink information in response to the reception of the uplink information, the UE 100 can receive the downlink information at the predetermined cycle. Since the UE 100 is not requested to monitor the downlink information until the transmission of the uplink information is started, the UE 100 can achieve power saving.

OTHER EMBODIMENTS

The contents of the present application have been described through the embodiment described above. However, the descriptions and drawings forming a part of the disclosure should not be understood to limit the present application. Various alternative embodiments, examples, and operation techniques are made obvious to those skilled in the art from the disclosure.

Although it has been described in the first embodiment that the data and the last identification information are transmitted, the present invention is not limited thereto. The last identification information may be transmitted by using the time and frequency resources of the plurality of time and frequency resources allocated to the UE 100 after the transmission of the last data is completed. For example, the UE 100 and/or the BS 200 may transmit the last data by using the time and frequency resources arranged within the first subframe, and may transmit the last identification information by using the time and frequency resources arranged within the second subframe.

Although it has been described in the second embodiment that the BS 200 is used as the example of the network apparatus, the present invention is not limited thereto. The network apparatus may be, for example, the MME 300. Accordingly, the BS 200 may be replaced with the MME 300. In this case, the signaling between the UE 100 and the MME 300 may be NAS signaling.

When the procedure (S1 UE Context Release Request) for releasing the context of the UE 100 is performed, the MME 300 may send the command (S1 UE Context Release Command) for releasing the context of the UE 100 in the BS 200 (EPC triggered).

Although the example of the case where the UE 100 is in the RRC inactive state has been described, the present invention is not limited thereto. The UE 100 may be in any state of the RRC connected state, the RRC idle state, and other RRC states.

In the aforementioned embodiments, the UE 100 may be an Internet of Things (IoT) device. For example, the UE 100 may be a radio communication apparatus that uses narrowband Internet of Things (Nb-IoT). The Nb-IoT enables the UE 100 to access a network service via the E-UTRAN 10 with a channel bandwidth restricted to 180 kHz. In this case, a narrowband physical downlink control channel (NPDCCH) may be used instead of the PDCCH. The NPDCCH may be a channel for notifying the NB-IoT UE of the allocation of resources for a narrowband physical downlink shared channel (NPDSCH). The NPDCCH can carry the uplink scheduling information (UL scheduling grant) for the NB-IoT UE. The NPDSCH can carry DL-SCH (downlink synchronization channel and PCH (paging channel) for the NB-IoT UE.

In the embodiment described above, the UE 100 may be a sensor module (an M2M device). The UE 100 may be a radio communication apparatus (such as Internet of Things gateway (IoT GW)) that manages (a plurality of) sensor modules. The IoT GW may represent the (plurality of) sensor modules managed by the IoT GW and perform communication with the network. The sensor modules do not have to include the function of performing communication with the network. The sensor modules managed by the IoT GW may include the function of performing communication with the IoT GW.

Contents according to the embodiments described above may be performed in combination with each other as appropriate. Furthermore, in each sequence described above, not all the operations are necessarily requisite. For example, it is possible to have only one or some of the operations performed in each sequence.

Although not particularly stated in the embodiments described above, there may be provided a program for causing a computer to perform each process that is to be performed by any one of the nodes (the UE 100, the BS 200, the MME 300, etc.) described above. The program may be recorded in a computer-readable medium. The program may be installed in a computer by using the computer-readable medium. The computer-readable medium where the program is recorded may be a non-transitory recording medium. The non-transitory recording medium may be, but not limited to, recording media such as CD-ROMs and DVD-ROMs.

There may be provided a chip including a memory storing the program for executing each process that is to be performed by any one of the UE 100, and the BS 200, and a processor for executing the program stored in the memory.

In the embodiments described above, an LTE system is described as an example of the mobile communication system, but the contents of the present application may be applied to systems other than the LTE system, without being limited to the LTE system. For example, the contents of the present application may be applied to a communication system for 5G.

INDUSTRIAL APPLICABILITY

The present invention is useful in the field of radio communication.

The invention claimed is:

1. A communication method, comprising:
    starting, by a first radio communication apparatus, transmission using a plurality of time and frequency resources which is allocated in order to transmit data to a second radio communication apparatus and is arranged in a time direction;
    transmitting, by the first radio communication apparatus, last data and last identification information indicating transmission of the last data to the second radio communication apparatus, at transmitting the last data to be transmitted to the second radio communication apparatus;
    predicting, by the first radio communication apparatus, that new data to be transmitted to the second radio communication apparatus is not to be generated during a predetermined period after the last data is transmitted; and
    transmitting, by the first radio communication apparatus, the last identification information to the second radio communication apparatus in response to the prediction.

2. The communication method according to claim 1, further comprising:
    performing, by the first radio communication apparatus, processing for releasing the plurality of time and frequency resources in response to transmission of the last identification information.

3. A chipset for a first radio communication apparatus, comprising:
    at least one processor and at least one memory, the at least one processor configured to execute processes of:
    starting transmission using a plurality of time and frequency resources which is allocated in order to transmit data to a second radio communication apparatus and is arranged in a time direction;
    transmitting last data and last identification information indicating transmission of the last data to the second radio communication apparatus, at transmitting the last data to be transmitted to the second radio communication apparatus;
    predicting that new data to be transmitted to the second radio communication apparatus is not to be generated during a predetermined period after the last data is transmitted; and
    transmitting the last identification information to the second radio communication apparatus in response to the prediction.

4. A radio communication apparatus comprising:
    a transmitter configured to:
        start transmission using a plurality of time and frequency resources which is allocated in order to transmit data to another radio communication apparatus and is arranged in a time direction; and
        transmit last data and last identification information indicating transmission of the last data to the another radio communication apparatus, at transmitting the last data to be transmitted to the another radio communication apparatus, and
    a controller configured to predict that new data to be transmitted to the another radio communication apparatus is not to be generated during a predetermined period after the last data is transmitted; wherein
    the transmitter is configured to transmit the last identification information to the another radio communication apparatus in response to the prediction.

* * * * *